US012334025B2

(12) United States Patent
Dahlquist

(10) Patent No.: US 12,334,025 B2
(45) Date of Patent: Jun. 17, 2025

(54) SYSTEMS AND METHODS OF ENHANCING QUALITY OF MULTIVIEW IMAGES USING A MULTIMODE DISPLAY

(71) Applicant: LEIA INC., Menlo Park, CA (US)

(72) Inventor: Nicolas Dahlquist, Redwood City, CA (US)

(73) Assignee: LEIA SPV LLC, Menlo Park, CA (US)

( * ) Notice: Subject to any disclaimer, the term of this patent is extended or adjusted under 35 U.S.C. 154(b) by 379 days.

(21) Appl. No.: 17/961,481

(22) Filed: Oct. 6, 2022

(65) Prior Publication Data

US 2023/0030728 A1 Feb. 2, 2023

Related U.S. Application Data

(63) Continuation of application No. PCT/US2020/067046, filed on Dec. 24, 2020.

(51) Int. Cl.
*G09G 3/34* (2006.01)
*G06T 3/40* (2024.01)
(Continued)

(52) U.S. Cl.
CPC .............. *G09G 3/342* (2013.01); *G06T 3/40* (2013.01); *G06T 7/136* (2017.01); *G06T 7/70* (2017.01);
(Continued)

(58) Field of Classification Search
CPC ... G06T 2207/20228; G06T 7/70; G06T 7/97; G06T 11/00; G06T 2207/20021;
(Continued)

(56) References Cited

U.S. PATENT DOCUMENTS 9,128,226 B2 9/2015 Fattal et al.
9,201,270 B2 12/2015 Fattal et al.
(Continued)

FOREIGN PATENT DOCUMENTS

CA 3134527 10/2020
CA 3176092 10/2021
(Continued)

OTHER PUBLICATIONS

Dongkyung Nam, et al. "2D/3D Mode Switchable Backlight Design", 2017 16th Workshop on Information Optics, Jul. 2017, 3 pages, IEEE.

(Continued)

*Primary Examiner* — Xiao M Wu
*Assistant Examiner* — Scott E Sonners
(74) *Attorney, Agent, or Firm* — Schwegman, Lundberg & Woessner, P.A.

(57) ABSTRACT

Described herein are system and methods to improve the image quality of a multiview image. In some embodiments a zero disparity plane image is generated based on a view of a multiview by identifying portions of the multiview image that correspond to the zero disparity plane. The zero disparity plane image and view images of the multiview image may be transmitted to a time-multiplexed display. The time-multiplexed display may operate according to a two-dimensional (2D) mode and a multiview mode. The time-multiplexed display may be configured to display the zero disparity plane image and the view images as a composite image.

20 Claims, 10 Drawing Sheets

(51) Int. Cl.

| | |
|---|---|
| *G06T 7/00* | (2017.01) |
| *G06T 7/136* | (2017.01) |
| *G06T 7/70* | (2017.01) |
| *G06T 11/00* | (2006.01) |
| *H04N 13/32* | (2018.01) |
| *H04N 13/359* | (2018.01) |
| *H04N 13/361* | (2018.01) |
| *H04N 13/398* | (2018.01) |

(52) U.S. Cl.
CPC .............. *G06T 7/97* (2017.01); *G06T 11/00* (2013.01); *G09G 3/3406* (2013.01); *G09G 3/3433* (2013.01); *H04N 13/32* (2018.05); *H04N 13/359* (2018.05); *H04N 13/361* (2018.05); *H04N 13/398* (2018.05); *G06T 2207/20021* (2013.01); *G06T 2207/20228* (2013.01); *G09G 2310/0297* (2013.01); *G09G 2340/0407* (2013.01)

(58) Field of Classification Search
CPC ..... G06T 3/40; G06T 1/20; G09G 2310/0297; G09G 2340/0407; G09G 3/3406; G09G 3/342; H04N 13/32; H04N 13/359; H04N 13/122; H04N 13/128; H04N 13/279; G02B 6/0036
See application file for complete search history.

(56) References Cited

U.S. PATENT DOCUMENTS

| | | | |
|---|---|---|---|
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,729,845 | B2 | 8/2017 | Chang et al. |
| 9,785,119 | B2 | 10/2017 | Taff et al. |
| 10,345,505 | B2 | 7/2019 | Fattal |
| 10,404,961 | B2 | 9/2019 | Chan et al. |
| 10,551,546 | B2 | 2/2020 | Fattal |
| 10,649,128 | B2 | 5/2020 | Fattal et al. |
| 10,705,281 | B2 | 7/2020 | Fattal et al. |
| 10,719,948 | B2 | 7/2020 | Vandame et al. |
| 10,798,371 | B2 | 10/2020 | Fattal |
| 10,802,212 | B2 | 10/2020 | Fattal |
| 10,802,443 | B2 | 10/2020 | Fattal |
| 10,830,939 | B2 | 11/2020 | Fattal et al. |
| 10,838,134 | B2 | 11/2020 | Fattal et al. |
| 10,884,175 | B2 | 1/2021 | Fattal |
| 10,928,564 | B2 | 2/2021 | Fattal |
| 10,928,677 | B2 | 2/2021 | Aieta et al. |
| 10,969,627 | B2 | 4/2021 | Fattal et al. |
| 11,004,407 | B2 | 5/2021 | Fattal et al. |
| 11,016,235 | B2 | 5/2021 | Fattal et al. |
| 11,041,988 | B2 | 6/2021 | Fattal et al. |
| 11,048,036 | B2 | 6/2021 | Ma et al. |
| 11,143,810 | B2 | 10/2021 | Fattal et al. |
| 11,143,811 | B2 | 10/2021 | Fattal et al. |
| 11,320,578 | B2 | 5/2022 | Fattal et al. |
| 2006/0181895 | A1 | 8/2006 | Hu et al. |
| 2007/0296721 | A1 | 12/2007 | Chang et al. |
| 2009/0040426 | A1 | 2/2009 | Mather et al. |
| 2009/0322986 | A1 | 12/2009 | Wei et al. |
| 2011/0304618 | A1 | 12/2011 | Chen et al. |
| 2012/0075289 | A1 | 3/2012 | Koh et al. |
| 2012/0120194 | A1* | 5/2012 | Newton ............... H04N 13/194 348/E13.064 |
| 2012/0127572 | A1 | 5/2012 | Takashashi et al. |
| 2012/0200807 | A1 | 8/2012 | Wei et al. |
| 2012/0235891 | A1 | 9/2012 | Nishitani et al. |
| 2013/0057575 | A1 | 3/2013 | An et al. |
| 2013/0169518 | A1 | 7/2013 | Wu et al. |
| 2013/0293534 | A1 | 11/2013 | Sato et al. |
| 2015/0304623 | A1 | 10/2015 | Yoon et al. |
| 2015/0350632 | A1 | 12/2015 | Chang et al. |
| 2016/0234487 | A1 | 8/2016 | Kroon et al. |
| 2017/0108636 | A1 | 4/2017 | Yoon et al. |
| 2017/0363794 | A1 | 12/2017 | Wan et al. |
| 2018/0156963 | A1 | 6/2018 | Fattal |
| 2018/0160107 | A1 | 6/2018 | Sohn et al. |
| 2018/0184066 | A1 | 6/2018 | Salahieh et al. |
| 2019/0018186 | A1 | 1/2019 | Fattal |
| 2019/0096049 | A1 | 3/2019 | Kim et al. |
| 2020/0005718 | A1 | 1/2020 | Fattal |
| 2020/0018886 | A1 | 1/2020 | Fattal et al. |
| 2020/0018891 | A1 | 1/2020 | Fattal et al. |
| 2020/0033526 | A1 | 1/2020 | Fattal et al. |
| 2020/0033621 | A1 | 1/2020 | Fattal et al. |
| 2020/0301165 | A1 | 9/2020 | Fattal |
| 2020/0310135 | A1 | 10/2020 | Fattal |
| 2020/0322590 | A1 | 10/2020 | Fattal et al. |
| 2021/0116757 | A1 | 4/2021 | Fattal |
| 2021/0157050 | A1 | 5/2021 | Fattal |
| 2021/0209980 | A1 | 7/2021 | Fattal |
| 2021/0314556 | A1 | 10/2021 | Fattal et al. |
| 2021/0333570 | A1 | 10/2021 | Fattal et al. |
| 2021/0364816 | A1 | 11/2021 | Fattal et al. |
| 2021/0390914 | A1 | 12/2021 | Fattal |
| 2021/0407438 | A1 | 12/2021 | Fattal |
| 2022/0035088 | A1 | 2/2022 | Fattal et al. |
| 2022/0044644 | A1 | 2/2022 | Fattal |
| 2022/0236596 | A1 | 7/2022 | Fattal |

FOREIGN PATENT DOCUMENTS

| | | |
|---|---|---|
| CN | 102474637 | 5/2012 |
| CN | 103270759 | 8/2013 |
| CN | 108603986 | 9/2018 |
| CN | 108604019 | 9/2018 |
| CN | 110462285 | 11/2019 |
| CN | 113748295 | 12/2021 |
| CN | 115462068 | 12/2022 |
| EP | 3959469 | 3/2022 |
| EP | 4111683 | 1/2023 |
| JP | 2006228723 | 8/2006 |
| JP | 2012114563 | 6/2012 |
| JP | 2012147399 | 8/2012 |
| JP | 2013538474 | 10/2013 |
| JP | 2013231933 | 11/2013 |
| JP | 5817135 | 10/2015 |
| JP | 2018523328 | 8/2018 |
| JP | 2018533165 | 11/2018 |
| JP | 2019502295 | 1/2019 |
| JP | 2022530212 | 6/2022 |
| JP | 2023529778 | 7/2023 |
| JP | 7362775 | 10/2023 |
| JP | 7471449 | 4/2024 |
| KR | 20130027214 A | 3/2013 |
| KR | 20130061290 A | 6/2013 |
| KR | 20140043718 | 4/2014 |
| KR | 20150096529 | 8/2015 |
| KR | 20170056784 | 5/2017 |
| KR | 20190036459 A | 4/2019 |
| KR | 20190051991 | 5/2019 |
| KR | 20210135348 | 11/2021 |
| KR | 20220149730 | 11/2022 |
| KR | 102632185 | 2/2024 |
| TW | 200630563 | 9/2006 |
| TW | 200707015 | 2/2007 |
| TW | 1539791 | 6/2016 |
| TW | 202101089 | 1/2021 |
| TW | 202211682 | 3/2022 |
| TW | 1762910 | 5/2022 |
| TW | 1786595 | 12/2022 |
| WO | 2011013036 | 2/2011 |
| WO | 2012038856 A1 | 3/2012 |
| WO | 2018067381 | 4/2018 |
| WO | 2018182991 | 10/2018 |
| WO | 2018186955 | 10/2018 |
| WO | 2019125793 | 6/2019 |
| WO | 2020219400 | 10/2020 |
| WO | 2021178079 A1 | 9/2021 |
| WO | 2021216136 | 10/2021 |

(56) References Cited

FOREIGN PATENT DOCUMENTS

| WO | 2022108609 | A1 | 5/2022 |
| WO | 2022125128 | A1 | 6/2022 |
| WO | 2022182368 | A1 | 9/2022 |
| WO | 2022182369 | A1 | 9/2022 |

OTHER PUBLICATIONS

Zhujun Shi and Federico Capasso, "Polarization-dependent metasurfaces for 2D/3D switchable displays", Proceedings of SPIE, Digital Optics for Immersive Displays, May 21, 2018, pp. 1067618-1 to 1067618-8, vol. 10676, Event: SPIE Photonics Europe, 2018, Strasbourg, France.

"Chinese Application Serial No. 202080100034.1, Office Action mailed Sep. 13, 2024", w English translation, 20 pgs.

"Chinese Application Serial No. 202080100034.1, Response filed Nov. 12, 2024 to Office Action mailed Sep. 13, 2024", w English claims, 48 pgs.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

International Search Report and Written Opinion (ISRWO) by International Searching Authority (ISA) Korean Intellectual Property Office (KIPO) dated Apr. 21, 2021 (9 pages) for foreign counterpart parent International Application No. PCT/US2020/067046.

"Canadian Application Serial No. 3,176,092, Examiners Rule 86(2) Report mailed Dec. 13, 2023", 3 pgs.

"Japanese Application Serial No. 2022-563345, Notification of Reasons for Refusal mailed Dec. 29, 2023", w English Translation, 6 pgs.

"European Application Serial No. 20931775.9, Partial Supplementary European Search Report mailed Feb. 15, 2024", 15 pgs.

"Chinese Application Serial No. 202080100034.1, Office Action mailed Jan. 31, 2024", w English Translation, 26 pgs.

"European Application Serial No. 20794508.0, Communication Pursuant to Article 94(3) EPC mailed Mar. 14, 2024", 6 pgs.

"Japanese Application Serial No. 2022-563345, Response filed Mar. 18, 2024 to Notification of Reasons for Refusal mailed Dec. 29, 2023", w English claims, 12 pgs.

"European Application Serial No. 20794508.0, Extended European Search Report mailed Nov. 24, 2022", 9 pgs.

"International Application Serial No. PCT US2020 067046, International Preliminary Report on Patentability mailed Nov. 3, 2022", 6 pgs.

"European Application Serial No. 20931775.9, Extended European Search Report mailed May 7, 2024", 15 pgs.

"European Application Serial No. 20931775.9, Response to Communication pursuant to Rules 161(2) and 162 EPC filed Mar. 30, 2023", 49 pgs.

"Chinese Application Serial No. 202080100034.1, Response filed May 29, 2024 to Office Action mailed Jan. 31, 2024", W English Claims, 10 pgs.

"European Application Serial No. 20794508.0, Response filed Jun. 24, 2024 to Communication Pursuant to Article 94(3) EPC mailed Mar. 14, 2024", 8 pgs.

"International Application Serial No. PCT US2020 029017, International Search Report mailed Aug. 7, 2020", 3 pgs.

"International Application Serial No. PCT US2020 029017, Written Opinion mailed Aug. 7, 2020", 5 pgs.

"International Application Serial No. PCT US2020 029017, International Preliminary Report on Patentability mailed Nov. 4, 2021", 7 pgs.

"Canadian Application Serial No. 3,176,092, Voluntary Amendment filed Sep. 16, 2022", 59 pgs.

"Canadian Application Serial No. 3,176,092, Response filed Apr. 2, 2024 to Examiners Rule 86(2) Report mailed Dec. 13, 2023", 56 pgs.

"Chinese Application Serial No. 202080030797.3, Office Action mailed Feb. 21, 2023", W English Translation, 24 pgs.

"Chinese Application Serial No. 202080030797.3, Response filed Jul. 10, 2023 to Office Action mailed Feb. 21, 2023", W English Claims, 37 pgs.

"Chinese Application Serial No. 202080030797.3, Office Action mailed Jul. 20, 2023", W English Translation, 21 pgs.

"Chinese Application Serial No. 202080030797.3, Response filed Sep. 22, 2023 to Office Action mailed Jul. 20, 2023", W English Claims, 37 pgs.

"Taiwanese Application Serial No. 110113295, Office Action mailed Feb. 11, 2022", W English Translation, 16 pgs.

"Taiwanese Application Serial No. 110113295, Response filed May 10, 2022 to Office Action mailed Feb. 11, 2022", W O English Claims, 5 pgs.

"Taiwanese Application Serial No. 110113295, Office Action mailed Apr. 19, 2021", W O English Translation, 2 pgs.

"Taiwanese Application Serial No. 109113516, Office Action mailed May 1, 2020", W O English Translation, 2 pgs.

"Taiwanese Application Serial No. 109113516, Office Action mailed Apr. 30, 2021", W English Translation, 14 pgs.

"Taiwanese Application Serial No. 109113516, Response filed Jul. 30, 2021 to Office Action mailed Apr. 30, 2021", W O English Claims, 3 pgs.

"Canadian Application Serial No. 3,134,527, Voluntary Amendment filed Sep. 21, 2021", 43 pgs.

"Canadian Application Serial No. 3,134,527, Office Action mailed Dec. 14, 2022", 4 pgs.

"Canadian Application Serial No. 3,134,527, Response filed Apr. 13, 2023 to Office Action mailed Dec. 14, 2022", 9 pgs.

"Japanese Application Serial No. 2021-562778, Notification of Reasons for Rejection mailed Nov. 1, 2022", W English Translation, 9 pgs.

"Japanese Application Serial No. 2021-562778, Response filed Mar. 31, 2023 to Notification of Reasons for Rejection mailed Nov. 1, 2022", W English Claims, 23 pgs.

"Japanese Application Serial No. 2021-562778, Notification of Reasons for Rejection mailed Jun. 20, 2023", W English Translation, 6 pgs.

"Korean Application Serial No. 10-2021-7035548, Notice of Preliminary Rejection mailed Jun. 30, 2023", W English Translation, 11 pgs.

"Korean Application Serial No. 10-2021-7035548, Response filed Oct. 13, 2023 to Notice of Preliminary Rejection mailed Jun. 30, 2023", W English Claims, 41 pgs.

"European Application Serial No. 20794508.0, Response filed May 10, 2022 to Communication pursuant to Rules 161(2) and 162 EPC mailed Nov. 30, 2021", 16 pgs.

"European Application Serial No. 20794508.0, Response filed May 24, 2023 to Extended European Search Report mailed Nov. 24, 2022", 14 pgs.

(56) References Cited

OTHER PUBLICATIONS

"European Application Serial No. 20931775.9, Response filed Nov. 22, 2024 to Extended European Search Report mailed May 7, 2024", 10 pgs.

"Chinese Application Serial No. 202080100034.1, Office Action mailed Dec. 13, 2024", w English Translation, 25 pgs.

"Canadian Application Serial No. 3,176,092, Response filed Dec. 20, 2024 to Examiners Rule 86(2) Report mailed Aug. 20, 2024", 56 pgs.

"Chinese Application Serial No. 202080100034.1, Response filed Jan. 21, 2025 to Office Action mailed Dec. 13, 2024", W English Claims, 47 pgs.

"Korean Application Serial No. 10-2022-7034257, Notice of Preliminary Rejection mailed Feb. 3, 2025", w English Translation, 9 pgs.

"European Application Serial No. 20794508.0, Summons to Attend Oral Proceedings mailed Feb. 13, 2025", 6 pgs.

"Chinese Application Serial No. 202080100034.1, Office Action mailed Mar. 27, 2025", w English translation, 23 pgs.

\* cited by examiner

SYSTEMS AND METHODS OF ENHANCING QUALITY OF MULTIVIEW IMAGES USING A MULTIMODE DISPLAY

CROSS-REFERENCE TO RELATED APPLICATIONS

This application is a continuation patent application of and claims priority to International Patent Application No. PCT/US2020/067046, filed Dec. 24, 2020, which claims priority to International Patent Application No. PCT/US2020/029017, filed on Apr. 20, 2020, the entirety of both of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light-emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments may have other features that are one of in addition to and in lieu of the features illustrated in the above-referenced figures. These and other features are detailed below with reference to the above-referenced figures.

DETAILED DESCRIPTION

Examples and embodiments in accordance with the principles described herein are directed to enhancing the quality of a displayed multiview image by operating a multimode display that includes at least both of a two-dimensional (2D) mode and a multiview mode. For a particular view, the multiview image is segmented into a set of view images optimized for display during the multiview mode and a 2D image that is optimized for display during the 2D mode. For example, during segmentation and using disparity data, pixels of the multiview image associated with a zero disparity plane of the multiview display are selected to be included in the 2D image that is rendered during the 2D mode. Accordingly, high resolution display capabilities of the 2D mode of the multimode display may be suitable for displaying these pixels that are included in the 2D image. Other pixels of the multiview image are rendered on the multiview display during the multiview mode. The pixels having some disparity are rendered on a multimode display in the multiview mode to convey a sense of depth to the multiview image. The 2D mode and multiview mode may rapidly switch to present a complete composite image having both zero disparity and non-zero disparity. This composite image may have desirable visual characteristics of both improved resolution and multiview properties, according to various embodiments.

Herein a 'two-dimensional (2D) display' or equivalent a 2D mode of a multimode display is defined as a display or mode configured to provide a view of an image that is substantially the same regardless of a direction from which the image is viewed (i.e., within a predefined viewing angle or range of the 2D display or 2D mode). A liquid crystal display (LCD) found in many smart phones and computer monitors are examples of 2D displays. In contrast herein, a 'multiview display' or equivalently a multiview mode of a multimode display is defined as an electronic display, display system or display mode of a multimode display configured to provide different views of a multiview image in or from different view directions. In particular, the different views may represent different perspective views of a scene or object of the multiview image. In some instances, a multiview display or multiview mode may also be referred to as a three-dimensional (3D) display or 3D mode, e.g., when simultaneously viewing two different views of the multiview image provides a perception of viewing a three-dimensional image.

Figure 1A:
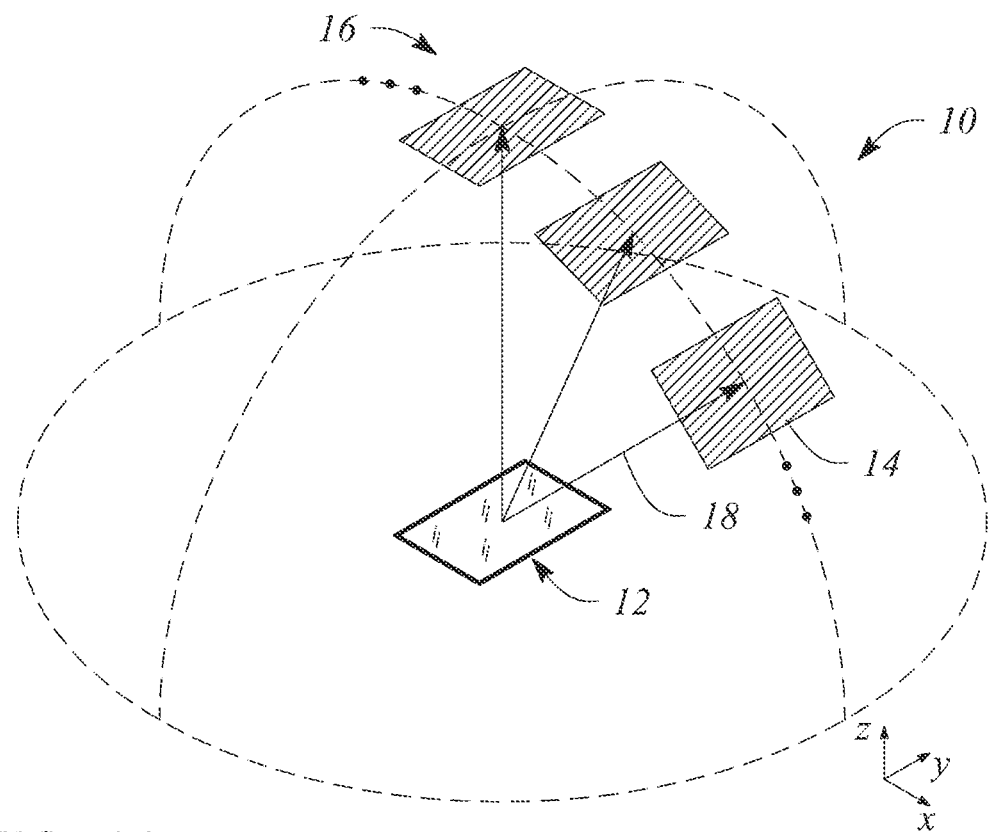
FIG. 1A illustrates a perspective view of a multiview display in an example, according to an embodiment consistent with the principles described herein.

FIG. 1A illustrates a perspective view of a multiview display 10 (or multiview mode of a multimode display) in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
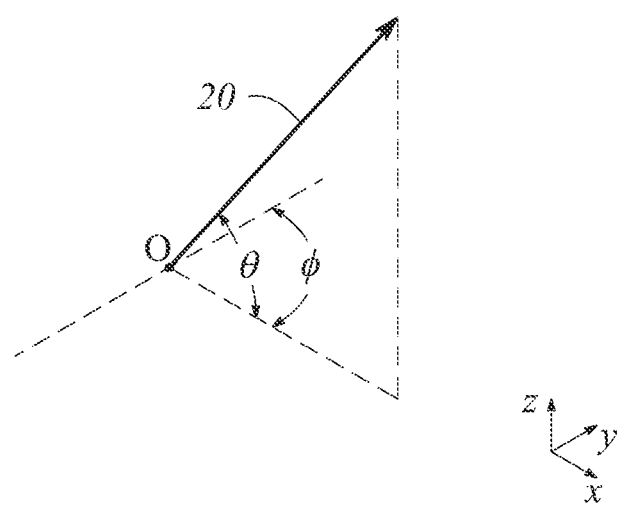
FIG. 1B illustrates a graphical representation of the angular components of a light beam having a particular principal angular direction in an example, according to an embodiment consistent with the principles described herein.

FIG. 1B illustrates a graphical representation of the angular components $\{\theta, \phi\}$ of a light beam 20 having a particular principal angular direction or simply 'direction' corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin, O.

Further herein, the term 'multiview' as used in the terms 'multiview image,' 'multiview display' and 'multiview mode' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' and 'multiview mode' as employed herein is explicitly distinguished from a stereoscopic display or stereoscopic mode that includes only two different views to represent a scene or an image. Note however, while multiview images and multiview displays of modes may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display or of a multimode display during a multiview mode. In particular, a multiview pixel may have individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1 y_1\}$ in each of the different views of a multiview image, while a second multiview pixel may have individual view pixels located at $\{x_2 y_2\}$ in each of the different views, and so on. In some embodiments, a number of view pixels in a multiview pixel may be equal to a number of views of the multiview display.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piecewise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

As defined herein, a 'non-zero propagation angle' of guided light is an angle relative to a guiding surface of a light guide. Further, the non-zero propagation angle is both greater than zero and less than a critical angle of total internal reflection within the light guide, by definition herein. Moreover, a specific non-zero propagation angle may be chosen (e.g., arbitrarily) for a particular implementation as long as the specific non-zero propagation angle is less than the critical angle of total internal reflection within the light guide. In various embodiments, the light may be introduced or coupled into the light guide 122 at the non-zero propagation angle of the guided light.

According to various embodiments, guided light or equivalently a guided 'light beam' produced by coupling light into the light guide may be a collimated light beam. Herein, a 'collimated light' or 'collimated light beam' is generally defined as a beam of light in which rays of the light beam are substantially parallel to one another within the light beam. Further, rays of light that diverge or are scattered from the collimated light beam are not considered to be part of the collimated light beam, by definition herein.

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality,' by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta,\phi\}$, by definition herein, and described above with respect to FIG. 1B.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display or during a multiview mode of a multimode display, may facilitate a perception of depth and thus appear to be an image of a 3D scene to a viewer, for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be greater than about sixty degrees (e.g., >±60°).

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Herein, 'zero disparity' is defined as a condition when there is an unnoticeable difference of an image location across different views (e.g., right eye and left eye) of the image. Zero disparity may apply to individual pixels. There is zero disparity with respect to a pixel if it is perceived as having the same location across different views of the image. Inversely, 'non-zero disparity' is defined as a condition when there is a noticeable difference of an image location between different views of the image. Herein, the term 'zero disparity plane' when used with respect to a 3D electronic display is defined as a plane or planar section of a 3D scene or region being displayed or rendered that appears identical (i.e., has no visual disparity) in all views of 3D electronic display. Further, by definition herein, the zero disparity plane appears at, corresponds to, or is coincident with a physical surface of the 3D electronic display. That is, an object in the displayed scene or region located at the zero disparity plane within the 3D region will appear to be collocated with the physical surface of the 3D electronic display when rendered by the 3D electronic display and viewed thereon. Objects that are farther away than the zero disparity plane will appear to be behind the physical surface, while objects that are closer than the zero disparity plane will appear to be in front of the physical surface.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
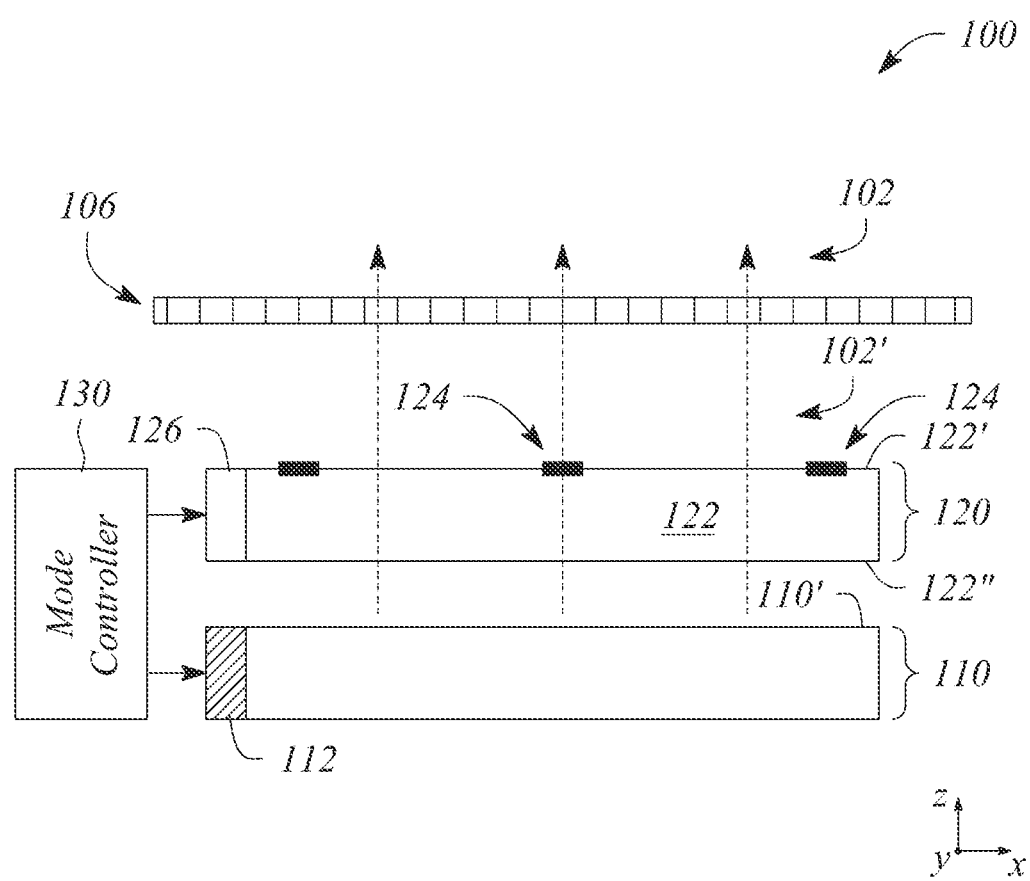
FIG. 2A illustrates a cross-sectional view of a time-multiplexed multimode display in an example, according to an embodiment consistent with the principles described herein.
Figure 2B:
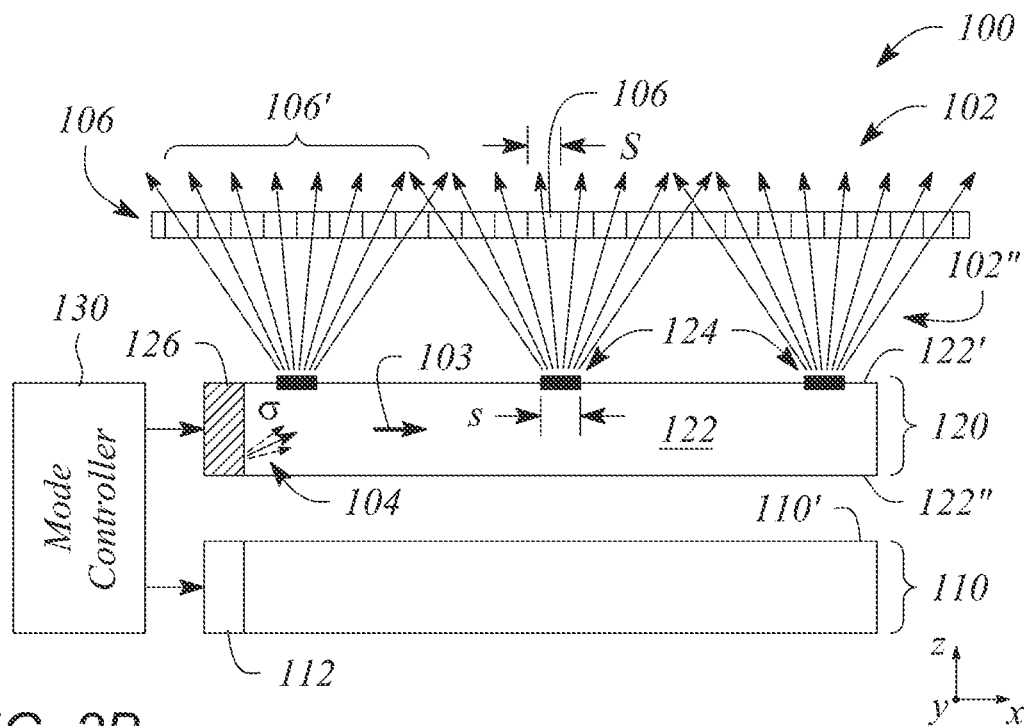
FIG. 2B illustrates a cross-sectional view of a time-multiplexed multimode display in another example, according to an embodiment consistent with the principles described herein.
Figure 2C:
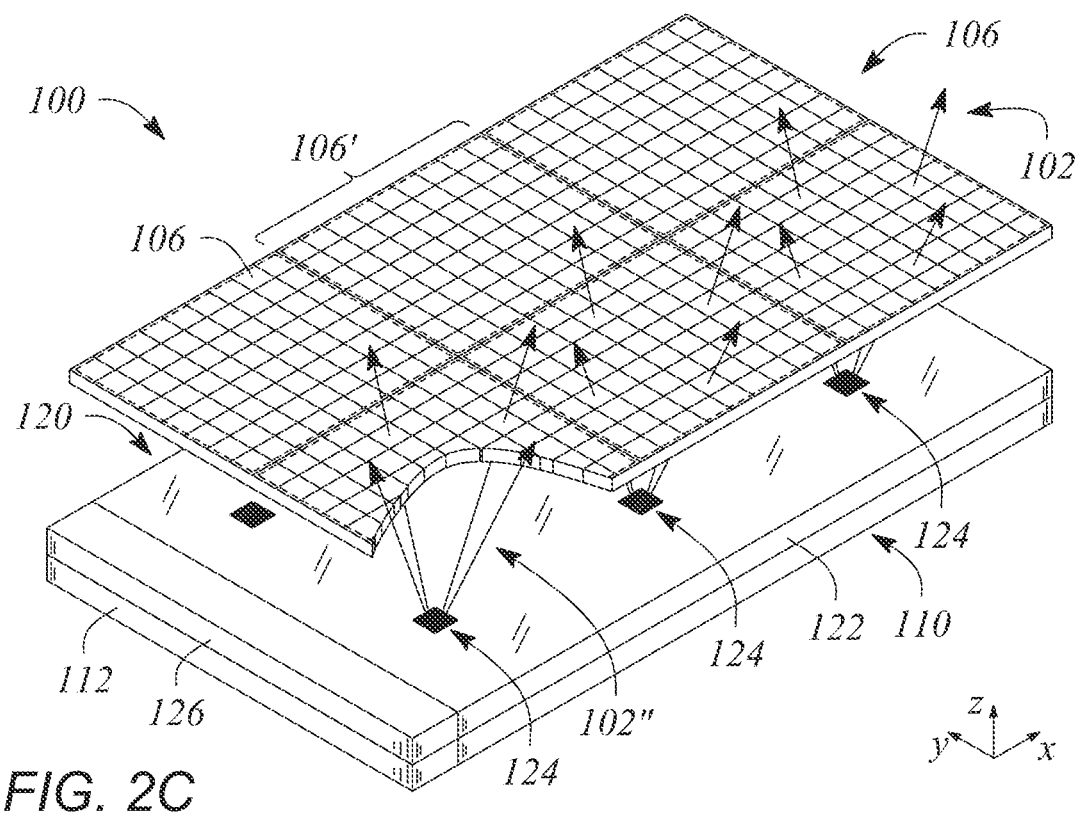
FIG. 2C illustrates a perspective view of a time-multiplexed multimode display in an example, according to an embodiment consistent with the principles described herein.

In accordance with some embodiments of the principles described herein, a time-multiplexed multimode display is provided. FIG. 2A illustrates a cross-sectional view of a time-multiplexed multimode display 100 in an example, according to an embodiment consistent with the principles described herein. FIG. 2B illustrates a cross-sectional view of a time-multiplexed multimode display 100 in another example, according to an embodiment consistent with the principles described herein. In particular, FIG. 2A illustrates the time-multiplexed multimode display 100 during or according to a first or two-dimensional (2D) mode. FIG. 2B illustrates the time-multiplexed multimode display 100 during or according to a second or multiview mode. FIG. 2C illustrates a perspective view of a time-multiplexed multimode display 100 in an example, according to an embodiment consistent with the principles described herein. The time-multiplexed multimode display 100 is illustrated in FIG. 2C during the multiview mode, by way of example and not limitation. Further, the 2D and multiview modes may be time-multiplexed in time-sequential or time-interlaced manner to provide the 2D and multiview modes in alternating first and second time intervals (e.g., alternating between FIGS. 2A and 2B), according to various embodiments. As such, the time-multiplexed multimode display 100 may also be referred to as a 'time-multiplexed, mode-switching' display.

As illustrated, the time-multiplexed multimode display 100 is configured to provide or emit light as emitted light 102. The emitted light 102 may be used to illuminate and provide images using the time-multiplexed multimode display 100, according to various examples and embodiments. For example, the emitted light 102 may be used to illuminate an array of light valves (e.g., light valves 106, described below) of the time-multiplexed multimode display 100. Further, in some embodiments, the time-multiplexed multimode display 100 may be configured to alternate between the display of a two-dimensional (2D) image and a multiview image using the emitted light 102 in or during sequential time intervals. Moreover, according to time-multiplexing or time-interlacing in the sequential time intervals, the 2D images and multiview images may be provided a composite image that includes both 2D and multiview content or information, as is described further below.

In particular, according to the two operational modes of the time-multiplexed multimode display 100, the emitted light 102 may have or exhibit different characteristics, according to time multiplexing. That is, light emitted by the time-multiplexed multimode display 100 as the emitted light 102 may comprise light that is either directional or substantially non-directional, according to the two different modes. For example, as described below in more detail, in the 2D mode, time-multiplexed multimode display 100 is configured to provide the emitted light 102 as broad-angle emitted light 102' as illustrated in FIG. 2A. Alternatively, in the multiview mode illustrated in FIG. 2B, the time-multiplexed multimode display 100 is configured to provide the emitted light 102 as directional emitted light 102".

According to various embodiments, the directional emitted light 102" provided during the multiview mode comprises a plurality of directional light beams having principal angular directions that differ from one another. Further, directional light beams of the directional emitted light 102" have directions corresponding to different view directions of a multiview image. Conversely, the broad-angle emitted light 102' is largely non-directional and further generally has a cone angle that is greater than a cone angle of a view of the multiview image or multiview display associated with the time-multiplexed multimode display 100, according to various embodiments. During operation of the time-multiplexed multimode display 100, the 2D mode may be activated in a first time interval and the multiview mode may be activated in a second time interval. Further, the first and second time intervals are interlaced with one another in a sequential manner according to time-multiplexing, in various embodiments.

The broad-angle emitted light 102' is illustrated in FIG. 2A during the first time interval as dashed arrows for ease of illustration. However, the dashed arrows representing the broad-angle emitted light 102' are not meant to imply any particular directionality of the emitted light 102, but instead merely represent the emission and transmission of light, e.g., from the time-multiplexed multimode display 100. Similarly, FIGS. 2B and 2C illustrate the directional light beams of the directional emitted light 102" during the second time interval as a plurality of diverging arrows. As described above, the different principal angular directions of directional light beams of the directional emitted light 102" emitted during the multiview mode correspond to respective view directions of a multiview image or equivalently of a multiview mode of the time-multiplexed multimode display 100. Further, the directional light beams may be or represent a light field, in various embodiments. In some embodiments, the broad-angle emitted light 102' and the directional emitted light 102" directional light beams of the emitted light 102 may be modulated (e.g., using light valves 106, as described below) to facilitate the display of information having one or both of 2D content and multiview or 3D image content.

As illustrated in FIGS. 2A-2C, the time-multiplexed multimode display 100 comprises a broad-angle backlight 110. The illustrated broad-angle backlight 110 has a planar or substantially planar light-emitting surface 110' configured to provide the broad-angle emitted light 102' during the 2D mode (e.g., see FIG. 2A). According to various embodiments, the broad-angle backlight 110 may be substantially any backlight having a light-emitting surface 110' configured to provide light to illuminate an array of light valves of a display. For example, the broad-angle backlight 110 may be a direct-emitting or directly illuminated planar backlight. Direct-emitting or directly illuminated planar backlights include, but are not limited to, a backlight panel employing a planar array of cold-cathode fluorescent lamps (CCFLs), neon lamps or light emitting diodes (LEDs) configured to directly illuminate the planar light-emitting surface 110' and provide the broad-angle emitted light 102'. An electroluminescent panel (ELP) is another non-limiting example of a direct-emitting planar backlight. In other examples, the broad-angle backlight 110 may comprise a backlight that employs an indirect light source. Such indirectly illuminated backlights may include, but are not limited to, various forms of edge-coupled or so-called 'edge-lit' backlights.

Figure 3:
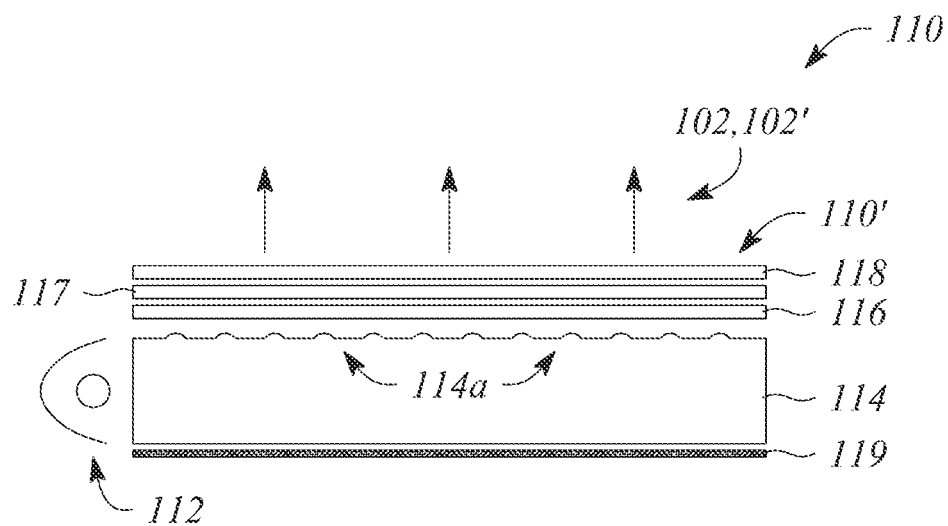
FIG. 3 illustrates a cross-sectional view of a broad-angle backlight in an example, according to an embodiment consistent with the principles described herein.

FIG. 3 illustrates a cross-sectional view of a broad-angle backlight 110 in an example, according to an embodiment consistent with the principles described herein. As illustrated in FIG. 3, the broad-angle backlight 110 is an edge-lit backlight and comprises a light source 112 coupled to an edge of the broad-angle backlight 110. The edge-coupled light source 112 is configured to produce light within the broad-angle backlight 110. Further, as illustrated by way of example and not limitation, the broad-angle backlight 110 comprises a guiding structure 114 (or light guide) having a substantially rectangular cross section with parallel opposing surfaces (i.e., a rectangular-shaped guiding structure) along with a plurality of extraction features 114a. The broad-angle backlight 110 illustrated in FIG. 3 comprises extraction features 114a at a surface (i.e., top surface) of the guiding structure 114 of the broad-angle backlight 110, by way of example and not limitation. Light from the edge-coupled light source 112 and guided within the rectangular-shaped guiding structure 114 may be redirected, scattered out of or otherwise extracted from the guiding structure 114 by the extraction features 114a to provide the broad-angle emitted light 102', according to various embodiments. The broad-angle backlight 110 is activated by activating or turning on the edge-coupled light source 112.

In some embodiments, the broad-angle backlight 110, whether direct-emitting or edge-lit (e.g., as illustrated in FIG. 3), may further comprise one or more additional layers or films including, but not limited to, a diffuser or diffusion layer, a brightness enhancement film (BEF), and a polarization recycling film or layer. For example, a diffuser may be configured to increase an emission angle of the broad-angle emitted light 102' when compared to that provided by the extraction features 114a alone. The brightness enhancement film may be used to increase an overall brightness of the broad-angle emitted light 102', in some examples. Brightness enhancement films (BEF) are available, for example, from 3M Optical Systems Division, St. Paul, MN as a Vikuiti™ BEF II which are micro-replicated enhancement films that utilize a prismatic structure to provide up to a 60% brightness gain. The polarization recycling layer may be configured to selectively pass a first polarization while reflecting a second polarization back toward the rectangular-shaped guiding structure 114. The polarization recycling layer may comprise a reflective polarizer film or dual brightness enhancement film (DBEF), for example. Examples of DBEF films include, but are not limited to, 3M Vikuiti™ Dual Brightness Enhancement Film available from 3M Optical Systems Division, St. Paul, MN In another example, an advanced polarization conversion film (APCF) or a combination of brightness enhancement and APCF films may be employed as the polarization recycling layer.

FIG. 3 illustrates the broad-angle backlight 110 further comprising a diffuser 116 adjacent to guiding structure 114 and the planar light-emitting surface 110' of the broad-angle backlight 110. Further, illustrated in FIG. 3 are a brightness enhancement film 117 and a polarization recycling layer 118, both of which are also adjacent to the planar light-emitting surface 110'. In some embodiments, the broad-angle backlight 110 further comprises a reflective layer 119 adjacent to a surface of the guiding structure 114 opposite to the planar light-emitting surface 110' (i.e., on a back surface), e.g., as illustrated in FIG. 3. The reflective layer 119 may comprise any of a variety of reflective films including, but not limited to, a layer of reflective metal or an enhanced specular reflector (ESR) film. Examples of ESR films include, but are not limited to, a Vikuiti™ Enhanced Specular Reflector Film available from 3M Optical Systems Division, St. Paul, MN Referring again to FIGS. 2A-2C, the time-multiplexed multimode display 100 further comprises a multiview backlight 120. As illustrated, the multiview backlight 120 comprises an array of multibeam elements 124. Multibeam elements 124 of the multibeam element array are spaced apart from one another across the multiview backlight 120, according to various embodiments. For example, in some embodiments, the multibeam elements 124 may be arranged in a one-dimensional (1D) array. In other embodiments, the multibeam elements 124 may be arranged in a two-dimensional (2D) array. Further, differing types of multibeam elements 124 may be utilized in the multiview backlight 120 including, but limited to, active emitters and various scattering elements. According to various embodiments, each multibeam element 124 of the multibeam element array is configured to provide a plurality of directional light beams having directions corresponding to different view directions of a multiview image during a multiview mode. In particular, directional light beams of the directional light beam plurality comprise the directional emitted light 102″ provided during the multiview mode, according to various embodiments.

In some embodiments (e.g., as illustrated), the multiview backlight 120 further comprises a light guide 122 configured to guide light as guided light 104. The light guide 122 may be a plate light guide, in some embodiments. According to various embodiments, the light guide 122 is configured to guide the guided light 104 along a length of the light guide 122 according to total internal reflection. A general propagation direction 103 of the guided light 104 within the light guide 122 is illustrated by a bold arrow in FIG. 2B. In some embodiments, the guided light 104 may be guided in the propagation direction 103 at a non-zero propagation angle and may comprise collimated light that is collimated according to a predetermined collimation factor a, as illustrated in FIG. 2B.

In various embodiments, the light guide 122 may include a dielectric material configured as an optical waveguide. The dielectric material may have a first refractive index that is greater than a second refractive index of a medium surrounding the dielectric optical waveguide. A difference in refractive indices is configured to facilitate total internal reflection of the guided light 104 according to one or more guided modes of the light guide 122, for example. In some embodiments, the light guide 122 may be a slab or plate optical waveguide comprising an extended, substantially planar sheet of optically transparent, dielectric material. According to various examples, the optically transparent material of the light guide 122 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 122 may further include a cladding layer (not illustrated) on at least a portion of a surface (e.g., one or both of the top surface and the bottom surface) of the light guide 122. The cladding layer may be used to further facilitate total internal reflection, according to some examples.

In embodiments that include the light guide 122, a multibeam element 124 of the multibeam element array may be configured to scatter out a portion of the guided light 104 from within the light guide 122 and to direct the scattered out portion away from a first surface 122′ of the light guide 122 or equivalent from a first surface of the multiview backlight 120 to provide the directional emitted light 102″, as illustrated in FIG. 2B. For example, the guided light portion may be scattered out by the multibeam element 124 through the first surface 122′. Further, as illustrated in FIGS. 2A-2C, a second surface of the multiview backlight 120 opposite to the first surface may be adjacent to the planar light-emitting surface 110′ of the broad-angle backlight 110, according to various embodiments.

Note that the plurality of directional light beams of the directional emitted light 102″, as illustrated in FIG. 2B, is or represents the plurality of directional light beams having different principal angular directions, described above. That is, a directional light beam has a different principal angular direction from other directional light beams of the directional emitted light 102″, according to various embodiments. Further, the multiview backlight 120 may be substantially transparent (e.g., in at least the 2D mode) to allow the broad-angle emitted light 102′ from the broad-angle backlight 110 to pass or be transmitted through a thickness of the multiview backlight 120, as illustrated in FIG. 2A by the dashed arrows that originate at the broad-angle backlight 110 and subsequently pass through the multiview backlight 120. In other words, the broad-angle emitted light 102′ provided by the broad-angle backlight 110 is configured to be transmitted through the multiview backlight 120 during the 2D mode, e.g., by virtue of the multiview backlight transparency.

For example, the light guide 122 and the spaced apart plurality of multibeam elements 124 may allow light to pass through the light guide 122 through both the first surface 122′ and the second surface 122″. Transparency may be facilitated, at least in part, due to both the relatively small size of the multibeam elements 124 and the relatively large inter-element spacing of the multibeam element 124. Further, especially when the multibeam elements 124 comprise diffraction gratings as described below, the multibeam elements 124 may also be substantially transparent to light propagating orthogonal to the first surface 122′ and the second surface 122″ of the light guide 122, in some embodiments. Thus, for example, light from the broad-angle backlight 110 may pass in the orthogonal direction through the light guide 122 with the multibeam element array of the multiview backlight 120, according to various embodiments.

In some embodiments (e.g., as illustrated in FIGS. 2A-2C), the multiview backlight 120 may further comprise a light source 126. As such, the multiview backlight 120 may be an edge-lit backlight, for example. According to various embodiments, the light source 126 is configured to provide the light to be guided within light guide 122. In particular, the light source 126 may be located adjacent to an entrance surface or end (input end) of the light guide 122. In various embodiments, the light source 126 may comprise substantially any source of light (e.g., optical emitter) including, but not limited to, one or more light emitting diodes (LEDs) or a laser (e.g., laser diode). In some embodiments, the light source 126 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 126 may be a substantially broadband light source configured to provide substantially broadband or polychromatic light. For example, the light source 126 may provide white light. In some embodiments, the light source 126 may comprise a plurality of different optical emitters configured to provide different colors of light. The different optical emitters may be configured to provide light having different, color-specific, non-zero propagation angles of the guided light corresponding to each of the different colors of light. As illustrated in FIG. 2B, activation of the multiview backlight 120 may comprise activating the light source 126.

In some embodiments, the light source 126 may further comprise a collimator (not illustrated). The collimator may be configured to receive substantially uncollimated light from one or more of the optical emitters of the light source 126. The collimator is further configured to convert the substantially uncollimated light into collimated light. In particular, the collimator may provide collimated light having the non-zero propagation angle and being collimated according to a predetermined collimation factors, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light to the light guide 122 to propagate as the guided light 104, described above.

As illustrated in FIGS. 2A-2B, the time-multiplexed multimode display 100 further comprises a mode controller 130. The mode controller 130 is configured to time-multiplex the 2D mode and multiview mode by sequentially activating the broad-angle backlight 110 during a first time interval and activating the multiview backlight 120 during a second time interval. In particular, according to some embodiments, the mode controller 130 may be configured to switch between the 2D mode and the multiview mode by sequentially activating a light source 112 of the broad-angle backlight 110 to provide the broad-angle emitted light 102' during the 2D mode and a light source 126 of the multiview backlight 120 to provide the directional emitted light 102" during the multiview mode. Activating the light source 112 during the first time interval is illustrated by cross-hatching of the light source 112 in FIG. 2A. Activating the light source 126 during the second time interval is illustrated by cross-hatching of the light source 126 in FIG. 2B.

In some embodiments, the mode controller 130 may be configured to switch between or time multiplex the 2D mode and the multiview mode at one or more predetermined frequencies, such as at a frequency selected to effectively display images of both modes concurrently via an array of light valves 106 for display to a viewer. By way of example, the array of light valves 106 may be an LCD panel operating at 120 Hz and the mode controller 130 may switch between the 2D mode and the multiview mode at 60 Hz (i.e., by sequentially activating each of the light source 112 of the broad-angle backlight 110 and the light source 126 of the multiview backlight 120 at about 60 Hz), to provide time-multiplexing. In another example, the LCD panel or light valve array may operate at 240 Hz and the 2D and multiview modes may be time-multiplexed at 120 Hz by the mode controller 130. According to some embodiments, the 2D mode and the multiview mode may be time-multiplexed by the mode controller 130 at a maximum rate corresponding to the highest switching speed or frequency at which the array of light valves is capable of operating while still being capable of providing images to a viewer, i.e., dependent upon the type and technology of the display. In certain embodiments, time-multiplexing of 2D and multiview modes provides the 2D image and the multiview image that are superimposed with each other on a time-multiplexed multiview display to provide a composite image. If the switching rate or activation rate of the 2D and multiview modes at least exceeds for each mode the visual persistence of a viewer using the display, each of the 2D image and the multiview image will appear to the user as being constantly present and without perceptible flicker in the composite image. A switching rate of at least about 60 Hz for each of the 2D mode and the multiview mode will provide this visual persistence goal (i.e., about or less than 1 millisecond in each mode). The mode controller 130 may be implemented one or both of as hardware comprising circuitry (e.g., an ASIC) and modules comprising software or firmware that are executed by a processor or similar circuitry to various operational characteristics of the mode controller 130, according to various embodiments.

Further, as mentioned above and according to various embodiments, multiview backlight 120 comprises the array of multibeam elements 124. According to some embodiments (e.g., as illustrated in FIGS. 2A-2C), multibeam elements 124 of the multibeam element array may be located at the first surface 122' of the light guide 122 (e.g., adjacent to the first surface of the multiview backlight 120). In other embodiments (not illustrated), the multibeam elements 124 may be located within the light guide 122. In yet other embodiments (not illustrated), the multibeam elements 124 may be located at or on the second surface 122" of the light guide 122 (e.g., adjacent to the second surface of the multiview backlight 120). Further, a size of the multibeam element 124 is comparable to a size of a light valve of a multiview display configured to display the multiview image. That is, the multibeam element size is comparable to a light valve size of a light valve array in the time-multiplexed multimode display 100, for example.

As illustrated in FIGS. 2A-2C, the time-multiplexed multimode display 100 further comprises an array of light valves 106 (e.g., of the multiview display), by way of example and not limitation. In various embodiments, any of a variety of different types of light valves may be employed as the light valves 106 of the light valve array including, but not limited to, one or more of liquid crystal light valves, electrophoretic light valves, and light valves based on or employing electrowetting. Further, as illustrated, there may be one unique set of light valves 106 for each multibeam element 124 of the array of multibeam elements. The unique set of light valves 106 may correspond to a multiview pixel 106' of the time-multiplexed multimode display 100, for example.

Herein, the 'size' may be defined in any of a variety of manners to include, but not be limited to, a length, a width or an area. For example, the size of a light valve may be a length thereof and the comparable size of the multibeam element 124 may also be a length of the multibeam element 124. In another example, size may refer to an area such that an area of the multibeam element 124 may be comparable to an area of the light valve. In some embodiments, the size of the multibeam element 124 is comparable to the light valve size such that the multibeam element size is between about twenty-five percent (25%) and about two hundred percent (200%) of the light valve size. For example, if the multibeam element size is denoted 's' and the light valve size is denoted 'S' (e.g., as illustrated in FIG. 2B), then the multibeam element size s may be given by equation (1) as $$\frac{1}{4}S \le s \le 2S \tag{1}$$

In other examples, the multibeam element size is greater than about fifty percent (50%) of the light valve size, or about sixty percent (60%) of the light valve size, or about seventy percent (70%) of the light valve size, or greater than about eighty percent (80%) of the light valve size, or greater than about ninety percent (90%) of the light valve size, and the multibeam element is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. For example, by 'comparable size', the multibeam element size may be between about seventy-five percent (75%) and about one hundred fifty (150%) of the light valve size. In another example, the multibeam element 124 may be comparable in size to the light valve where the multibeam element size is between about one hundred twenty-five percent (125%) and about eighty-five percent (85%) of the light valve size. According to some embodiments, the comparable sizes of the multibeam element 124 and the light valve may be chosen to reduce, or in some examples to minimize, dark zones between views of the multiview display, while at the same time reducing, or in some examples minimizing, an overlap between views of the multiview display or equivalent of the multiview image.

Note that, as illustrated in FIG. 2B, the size (e.g. width) of a multibeam element 124 may correspond to a size (e.g., width) of a light valve 106 in the light valve array. In other examples, the multibeam element size may be defined as a distance (e.g., a center-to-center distance) between adjacent light valves 106 of the light valve array. For example, the light valves 106 may be smaller than the center-to-center distance between the light valves 106 in the light valve array. Further, a spacing between adjacent multibeam elements of the multibeam element array may be commensurate with a spacing between adjacent multiview pixels of the multiview display. For example, an inter-emitter distance (e.g., center-to-center distance) between a pair of adjacent multibeam elements 124 may be equal to an inter-pixel distance (e.g., a center-to-center distance) between a corresponding adjacent pair of multiview pixels, e.g., represented by sets of light valves of the array of light valves 106. As such, the multibeam element size may be defined as either the size of the light valve 106 itself or a size corresponding to the center-to-center distance between the light valves 106, for example.

In some embodiments, a relationship between the multibeam elements 124 of the plurality and corresponding multiview pixels (e.g., sets of light valves 106) may be a one-to-one relationship. That is, there may be an equal number of multiview pixels and multibeam elements 124. FIGS. 2B and 2C explicitly illustrate by way of example the one-to-one relationship where each multiview pixel 106' comprising a different set of light valves 106. In other embodiments (not illustrated), the number of multiview pixels 106' and multibeam elements 124 may differ from one another.

In some embodiments, an inter-element distance (e.g., center-to-center distance) between a pair of adjacent multibeam elements 124 of the plurality may be equal to an inter-pixel distance (e.g., a center-to-center distance) between a corresponding adjacent pair of multiview pixels 106', e.g., represented by light valve sets. In other embodiments (not illustrated), the relative center-to-center distances of pairs of multibeam elements 124 and corresponding light valve sets may differ, e.g., the multibeam elements 124 may have an inter-element spacing (i.e., center-to-center distance) that is one of greater than or less than a spacing (i.e., center-to-center distance) between light valve sets representing multiview pixels 106'. Further (e.g., as illustrated in FIG. 2B), each multibeam element 124 may be configured to provide directional emitted light 102" to one and only one multiview pixel 106', according to some embodiments. In particular, for a given one of the multibeam elements 124, the directional emitted light 102" having different principal angular directions corresponding to the different views of the multiview display are substantially confined to a single corresponding multiview pixel 106' and the light valves 106 thereof, i.e., a single set of light valves 106 corresponding to the multibeam element 124, as illustrated in FIG. 2B. As such, each multibeam element 124 of the broad-angle backlight 110 provides a corresponding plurality of directional light beams of the directional emitted light 102" that has a set of the different principal angular directions corresponding to the different views of the multiview image (i.e., the set of directional light beams contains a light beam having a direction corresponding to each of the different view directions).

According to various embodiments, the multibeam elements 124 of the multiview backlight 120 may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 124 comprising a diffraction grating is configured to diffractively couple or scatter out the guided light portion as the directional emitted light 102" comprising a plurality of directional light beams having the different principal angular directions. In some embodiments, a diffraction grating of a multibeam element may comprise a plurality of individual sub-gratings. In other embodiments, the multibeam element 124 comprising a micro-reflective element is configured to reflectively couple or scatter out the guided light portion as the plurality of directional light beams, or the multibeam element 124 comprising a micro-refractive element is configured to couple or scatter out the guided light portion as the plurality of directional light beams by or using refraction (i.e., refractively scatter out the guided light portion).

In accordance with other embodiments of the principles described herein, a method of time-multiplexed multimode display operation is provided. In particular, the method of time-multiplexed multimode display operation may have at least two modes, namely a 2D mode and a multiview mode, which are time-multiplexed or time-interlaced. The 2D mode may display a two-dimensional (2D) image, while the multiview mode may display a three-dimensional (3D) or a multiview image, according to various embodiments. Time-multiplexing combines the 2D image and the 3D or multiview image as a composite image having both 2D and multiview content or information.

Figure 4:
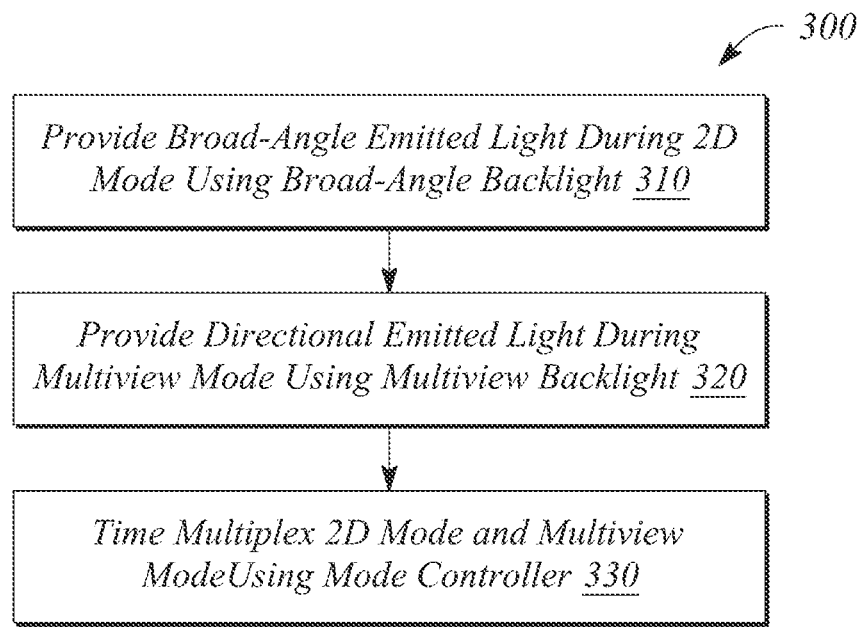
FIG. 4 illustrates a flow chart of a method of time-multiplexed multimode display operation in an example, according to an embodiment consistent with the principles described herein.

FIG. 4 illustrates a flow chart of a method 300 of time-multiplexed multimode display operation in an example, according to an embodiment consistent with the principles described herein. As illustrated in FIG. 4, the method of time-multiplexed multimode display operation comprises providing 310 broad-angle emitted light during a 2D mode using a broad-angle backlight. In some embodiments, the broad-angle backlight may be substantially similar to the broad-angle backlight 110 of the time-multiplexed multimode display 100, described above. Further, the 2D mode and the emitted broad-angle light may be substantially similar to respective ones of the 2D mode (e.g., in FIGS. 2A-2C) and the broad-angle emitted light 102' described above with respect to the time-multiplexed backlights and displays, according to some embodiments.

The method 300 of time-multiplexed multimode display operation further comprises providing 320 a plurality directional emitted light during a multiview mode using a multiview backlight having an array of multibeam elements spaced apart from one another. According to various embodiments, the directional emitted light comprises a plurality of directional light beams provided by each multibeam element of the multibeam element array. Directions of directional light beams of the directional light beam plurality correspond to different view directions of a multiview image, according to various embodiments. In some embodiments, the multiview backlight may be substantially similar to the multiview backlight 120 described above. Similarly, the multiview mode may be substantially similar to the multiview mode of the time-multiplexed multimode display 100 described above with respect to FIGS. 2A-2C, according to some embodiments. In some embodiments, the multiview backlight may be positioned adjacent to the emission surface of the broad-angle backlight and be transparent to the broad-angle emitted light during the 2D mode.

The method 300 of time-multiplexed multimode display operation illustrated in FIG. 4 further comprises time-multiplexing 330 the 2D mode and the multiview mode using a mode controller to sequentially activate the broad-angle backlight during a first sequential time interval corresponding to the 2D mode and the multiview backlight during a second sequential time interval corresponding to the multiview mode. In some embodiments, the mode controller may be substantially similar to the mode controller 130 described above. In particular, the mode controller may be implemented one or both of as hardware comprising circuitry (e.g., an ASIC) and modules comprising software or firmware that are executed by a processor or similar circuitry to perform the actions of the mode controller.

According to some embodiments, the method 300 of time-multiplexed multimode display operation further comprises modulating the broad-angle emitted light using an array of light valves to provide a 2D image during the 2D mode and modulating the plurality of directional light beams using the light valve array to provide a multiview image during the multiview mode. In some of these embodiments, the time-multiplexing the 2D mode and the multiview mode may superimpose the 2D image and multiview images to provide a composite image comprising both 2D content and multiview content. In some embodiments, the array of light valves may be substantially similar to the array of light valves 106, described above with respect to the time-multiplexed multimode display 100.

Embodiments are directed to systems and methods of operating a time-multiplexed multimode display such as, for example, the time-multiplexed multimode display 100 of FIGS. 2A-2C. The time-multiplexed multimode display may be operated in a manner to enhance the quality of multiview images that are to be rendered for display. A multiview image may be processed in accordance with embodiments presented herein to output a composite multiview image that is perceived by the viewer. The composite multiview image may have superior visual quality compared to a rendering of the multiview image. The time-multiplexed multimode display may be operated by identifying pixels within a multiview image that correspond to a zero disparity plane of the time-multiplexed multimode display. For example, a disparity map may include disparity information indicating the location of a zero disparity plane (ZDP) of the multiview image when it is rendered.

In some embodiments, the time-multiplexed multimode display is operated by generating an image mask from the disparity map based on a predetermined disparity threshold of zero disparity. For example, the image mask (e.g., a bitmap mask) may be formatted such that each pixel in the image mask is a binary value to either mask or unmask a corresponding pixel of an input image. The image mask may be generated from a disparity map, where the disparity map contains a disparity value at each pixel location of the disparity map. The disparity value may be converted into a binary value by applying a predetermined disparity threshold of zero disparity. The predetermined disparity threshold of zero disparity may be a particular range of disparity values.

The time-multiplexed multimode display may be operated by displaying the zero disparity plane image using the time-multiplexed multimode display during a two-dimensional (2D) mode of the time-multiplexed multimode display. For example, the 2D mode of the time-multiplexed multimode display may be selected. This may involve activating a backlight for the 2D mode to allow the ZDP image to be displayed during the 2D mode.

In addition, time-multiplexed multimode display may be operated by displaying a set of rendered view images of the multiview image on the time-multiplexed multimode display during a multiview mode of the time-multiplexed multimode display. The set of rendered view images of the multiview images may be view images that are derived from the multiview image. The multiview mode of the time-multiplexed multimode display may be selected. This may involve activating a backlight for the multiview mode to allow the view images to be displayed during a multiview mode. The time-multiplexed multimode display is configured to switch between the 2D mode and the multiview mode to sequentially display the zero disparity plane image and the set of rendered view images on the time-multiplexed multimode display as a composite image.

In some embodiments, the set of rendered view images are processed before they are rendered for display. This may involve down-sampling such that the set of rendered view images are down-sampled to a multiview resolution of the time-multiplexed multimode display. In addition, the zero disparity plane image may have a resolution of the set of view images prior to down-sampling. For example, the multiview image, before it is enhanced, may have a relatively high resolution. The multiview mode of time-multiplexed multimode display may be configured to display the views of the multiview image, where each view is a lower resolution compared to the original multiview image. Thus, to accommodate the display, in this embodiment, each view image may be down-sampled. Down-sampling an image may comprise reducing the resolution of the image by selecting a subset of pixels or otherwise blending neighboring pixels together to reduce the resolution of the image. The ZDP image may be generated from the multiview image such that the ZDP image is not down-sampled, thereby preserving the original high resolution.

In some embodiments, the rendered view images that are generated by removing the identified pixels from the multiview image to provide a luminance curve match between image content of the zero disparity plane image and the set of rendered view images within the composite image. For example, an inverse of the image mask that is used to generate the ZDP image may be applied to the multiview image to generate the rendered view images. By removing these pixels from the multiview image, the time-multiplexed multimode display does not display these pixels during the multiview mode. In addition, the ZDP image displays these pixels during the 2D mode. The resulting composite multiview image appears to have visually appealing luminance such that the image content is not displayed during both the 2D mode and the multiview mode, but rather, the image content is displayed during the 2D mode only.

The time-multiplexed multimode display may be operated by applying a feather mask to one or both of the zero disparity plane image and the view images of the multiview image. A feather mask may smoothen the edges and remove sharpness resulting in applying an image mask to one or both of one of the zero disparity plane image and the view images of the multiview image.

In some embodiments, the time-multiplexed multimode display is operated by providing a broad-angle emitted light during a 2D mode using a broad-angle backlight. In addition, the multiview display system may be configured to provide directional emitted light during a multiview mode using a multiview backlight having an array of multibeam elements, the directional emitted light comprising a plurality of directional light beams provided by each multibeam element of the multibeam element array. The multiview display system may be configured to time multiplex the 2D and multiview modes using a mode controller to sequentially activate the broad-angle backlight during a first sequential time interval corresponding to the 2D mode and the multiview backlight during a second sequential time interval corresponding to the multiview mode. Directions of directional light beams of the directional light beam plurality may correspond to different view directions of the set of rendered view images.

The multiview mode may use a multiview backlight instead of a broad-angle backlight. The multiview backlight may have an array of multibeam elements that scatter light as plurality of directional light beams having principal angular directions that differ from one another. For example, if the time-multiplexed multimode display operates in a multiview mode to display a multiview image having four views, the multiview backlight may scatter light into four directional light beams, each directional light beam corresponding to a different view. A mode controller may sequentially switch between 2D mode and multiview mode so that a multiview image is displayed in a first sequential time interval using the multiview backlight and a 2D image is displayed in a second sequential time interval using the broad-angle backlight.

In some embodiments, the multiview display system is configured to guide light in a light guide as guided light. In some embodiments, the guided light within the light guide is collimated according to a predetermined collimation factor.

In some embodiments, the multiview display system is configured to scatter out a portion of the guided light as the directional emitted light using multibeam elements of the multibeam element array, each multibeam element of the multibeam element array comprising one or more of a diffraction grating, a micro-refractive element, and a micro-reflective element. In some embodiments, a diffraction grating of a multibeam element may comprise a plurality of individual sub-gratings. In some embodiments, a micro-reflective element is configured to reflectively couple or scatter out the guided light portion as the plurality of directional light beams. The micro-reflective element may have a reflective coating to control the way guided light is scattered. In some embodiments, the multibeam element comprises a micro-refractive element that is configured to couple or scatter out the guided light portion as the plurality of directional light beams by or using refraction (i.e., refractively scatter out the guided light portion).

In some embodiments, operating the time-multiplexed multimode display providing a providing broad-angle emitted light during the 2D mode using a broad-angle backlight and providing directional emitted light during a multiview mode using a multiview backlight having an array of multibeam elements, the directional emitted light comprising a plurality of directional light beams provided by each multibeam element of the multibeam element array. Operating the time-multiplexed multimode display involves time multiplexing the 2D mode and the multiview mode using a mode controller to sequentially activate the broad-angle backlight during a first sequential time interval corresponding to the 2D mode and the multiview backlight during a second sequential time interval corresponding to the multiview mode, wherein directions of directional light beams of the directional light beam plurality correspond to different view directions of a multiview image.

Figure 5:
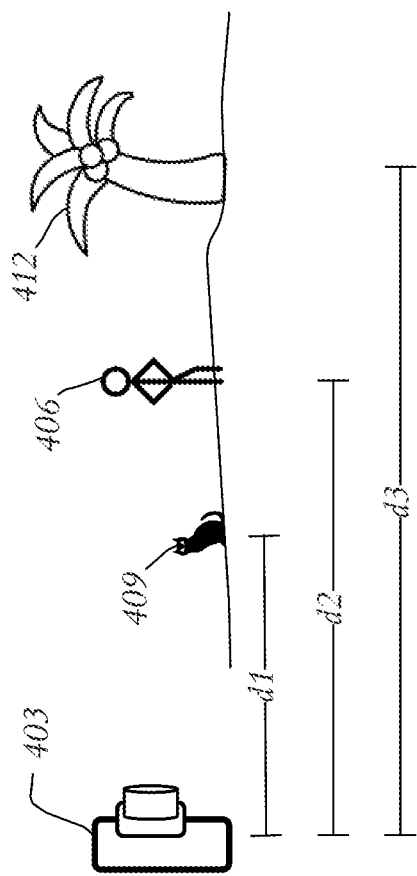
FIG. 5 illustrates capturing an image that is to be formatted as a multiview image in an example, according to an embodiment consistent with the principles described herein.

FIG. 5 illustrates capturing an image that is to be formatted as a multiview image in an example, according to an embodiment consistent with the principles described herein. A multiview image may be created by capturing one or more images from a camera 403, by computer generated information, or a combination thereof. The camera 403 may be a system of multiple cameras spaced apart by a particular distance to capture multiple views of a scene. Alternatively, the camera 403 may be a single point camera that captures a scene from a single perspective at a time, e.g., multiple virtual cameras. The scene shown in the example of FIG. 5 includes a first object 406 (also referred to as a person in this example), a second object 409 (also referred to as a cat in this example), and a third object 412 (also referred to as a tree in this example). The person may be the object of interest or the primary object in this example. The cat is positioned as a secondary object in front of the person and the tree is part of the background positioned behind the person and cat.

Each object 406, 409, 412 may correspond to a particular depth d1, d2, and d3, respectively, relative to the camera 403. For example, the cat has the shortest depth d1, the tree has the largest depth d3, and the person has a depth d2 in between the cat and the tree. The depths d1-d3 of each object 406, 409, 412 creates a disparity between the different views from the perspective of the camera. To explain further, assume the camera 403 is made up of two cameras spaced apart by a particular distance. This allows the camera 403 to provide stereoscopic images. Each image has a slightly different view of the scene of objects 406, 409, 412 to create a disparity. This disparity allows the viewer to perceive depth when images captured by the camera are viewed in a manner that directs one image to one eye and the other image to the other eye. The disparity between other objects changes as a function of depth relative to the camera 403. Thus, the amount of disparity changes depending on the depth relative to the camera 403. Disparity is inversely related to depth.

Embodiments are directed to improving the image quality of the multiview image 421 when displayed. A multiview display has the ability to present multiple views concurrently but might have less resolution than a 2D display. Embodiments are directed to leveraging a multimode display that is configured to utilize both a 2D mode and multiview mode to display images. According to embodiments, the multiview image may be segmented into a set of images (e.g., view images) and a second image where the set of images is configured to be presented via the multiview mode and the second image is presented via the 2D mode. The image segmentation process may use disparity information associated with each view. Pixels of a view image having zero (zero or near zero) disparity are presented on the display during the 2D mode. Those pixels of an image having zero disparity may be perceived as or essentially are the same across all views of a multiview image. For example, a person at a distance that corresponds to the zero disparity plane (ZDP) of the multimode display may have pixels corresponding to the person rendered on the display during 2D mode. Portions of a view having non-zero disparity are presented on the display during multi view mode. The remaining figures illustrate this image segmentation process using disparity data.

Figure 6:
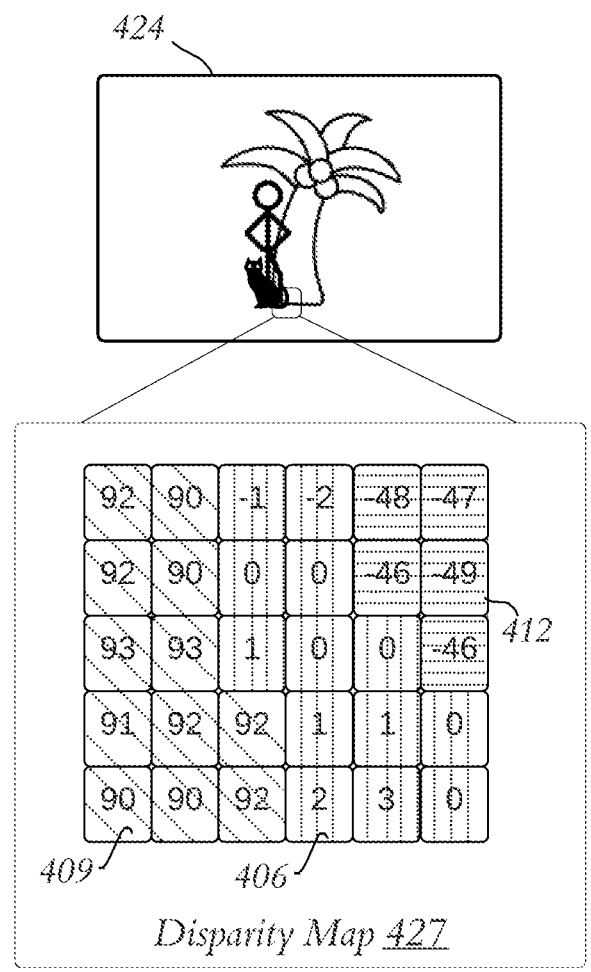
FIG. 6 illustrates a portion of a disparity map of an arbitrary view of a multiview image in an example, according to an embodiment consistent with the principles described herein.

FIG. 6 illustrates a portion of a disparity map 427 of an arbitrary view image 424 of a multiview image in an example, according to an embodiment consistent with the principles described herein. A disparity map 427 may be generated for at least one of the views of a multiview image. A disparity map 427 associates each pixel (or potentially a cluster of pixels) to a corresponding disparity value. The disparity value quantifies the disparity in terms of distance relative to a common point among the views of a multiview image. For example, a pixel having a large disparity value for a first view means that, with respect to a corresponding pixel in a second view, there is a large difference in where the pixel and corresponding pixel appear to the viewer from a particular viewing angle.

Herein a 'disparity map' is defined as information indicating an apparent pixel difference between at least two views of multiview image. In this respect, a disparity map controls the apparent disparity of rendered pixels by specifying where pixels should be rendered on the multiview display. When disparity is zero (e.g., equal to zero or about zero) the pixels representing an object appear to the viewer at the same location. When rendered on a multiview display, pixels having zero disparity appear to viewer as located on the screen display while pixels having non-zero disparity appear either in front of or behind the screen of the display. The disparity map 427 of FIG. 6 comprises disparity values for a portion of a view image 424 of a multiview image. Specifically, in this example, the portion shown in FIG. 6 includes part of the person, cat, and tree, which appear at varying depths, by way of example and not limitation.

The disparity map 427 of a multiview image controls which pixels of the multiview image will fall on the ZDP at the time the multiview image is rendered for display. The location of these pixels with respect to the ZDP is encoded in the disparity map as disparity values representing zero disparity. The disparity map 427 may be modified to account for shifting the multiview image with respect to the ZDP. For example, if a user wishes to change the location of the displayed multiview image relative to the ZDP, the disparity map 427 may be updated to reflect the new location. This may involve scaling the disparity values in a manner that corresponds to the change of the ZDP location.

The portion of the disparity map 427 shows pixels representing a first object 406 (e.g., a person), pixels representing a second object 409 (e.g., cat), and pixels representing a third object 412 (e.g., tree). Each pixel value in the disparity map 427 represents the disparity of a corresponding pixel of a view image 424 of a multiview image. For example, a set of pixels in the view image 424 may represent a part of a person. The disparity map 427 for this view image 424 has a corresponding set of pixels for the portion of the person equal to disparity values around −2 to 3. A set of pixels in the view image 424 may represent a part of a cat. The disparity map 427 for this view image 424 has a corresponding set of pixels for the portion of the cat equal to disparity values around 90 to 93. A set of pixels in the view image 424 may represent a part of a tree. The disparity map 427 for this view image 424 has a corresponding set of pixels for the portion of the tree equal to disparity values around −46 to −49. Thus, FIG. 6 shows disparity values for the first object 406 (person) shaded in vertical lines, disparity values for the second object 409 (cat) shaded in diagonal lines, and disparity values for the third object 412 (tree) shaded in horizontal lines. Thus, the disparity values may be recorded on a per pixel basis for each pixel in the disparity map 427.

Disparity values that equal to zero or about zero represent pixels in a view image 424 that fall on the ZDP, when the multiview image is rendered on a display, e.g., a multiview display or during a multiview mode of the above-described time-multiplexed multimode display 100. Thus, the disparity map 427 shows how the first object 406 falls in the ZDP of the display. For example, pixels that correspond to the ZDP may be defined as pixels having disparity values between about minus ten (−10) and about ten (10). Alternatively, pixels corresponding to the ZDP may be defined as pixels having disparity values of zero (0), within the range of about minus one (−1) to about one (1), within the range of about minus five (−5) to about five (5), or substantially any other range that is within a predetermined threshold of zero (0). As such, pixels having zero disparity or corresponding to the ZDP (e.g., pixels including the first object 406) have little to no disparity between the different views of the multiview image. Pixels that include objects in front of the ZDP in terms of depth may have positive disparity values while pixels that include objects behind the ZDP in terms of depth may have negative disparity values. Thus, the disparity map 427 includes ZDP data that specifies how pixels are to be rendered with respect to the ZDP when the multiview image is rendered on a multiview display.

Similar to a disparity map is a depth map. A depth map associates a depth to a corresponding pixel, where the depth is relative to a common perspective across the multiple views (e.g., the location of hypothetical camera that captured the multiview image). Some embodiments may be directed to using a depth map instead of a disparity map, as depth may be inferred from disparity and disparity may be inferred from depth. Depth values may be converted into disparity values according to equation (2) as:

$$D = \frac{f \cdot b}{d} \qquad (2)$$

where f is the focal length, the length between the lens (e.g., viewer or hypothetical camera) and the image point and where b is the baseline, the distance between the points of view (e.g., distance between two lenses that capture a stereoscopic image). Further, in equation (3), D is disparity and dis depth. In the example above, the focal length is the distance between the camera 403 and a point on the first object 406 representing the image point. The baseline is be the distance between two camera views (e.g., the distance between the right eye and left eye). The focal length and baseline may be distances determined at the time the multiview image was captured by a camera. The focal length and baseline may be computer generated in response to predictively or artificially generating different views using a computer vision process.

Figure 7:
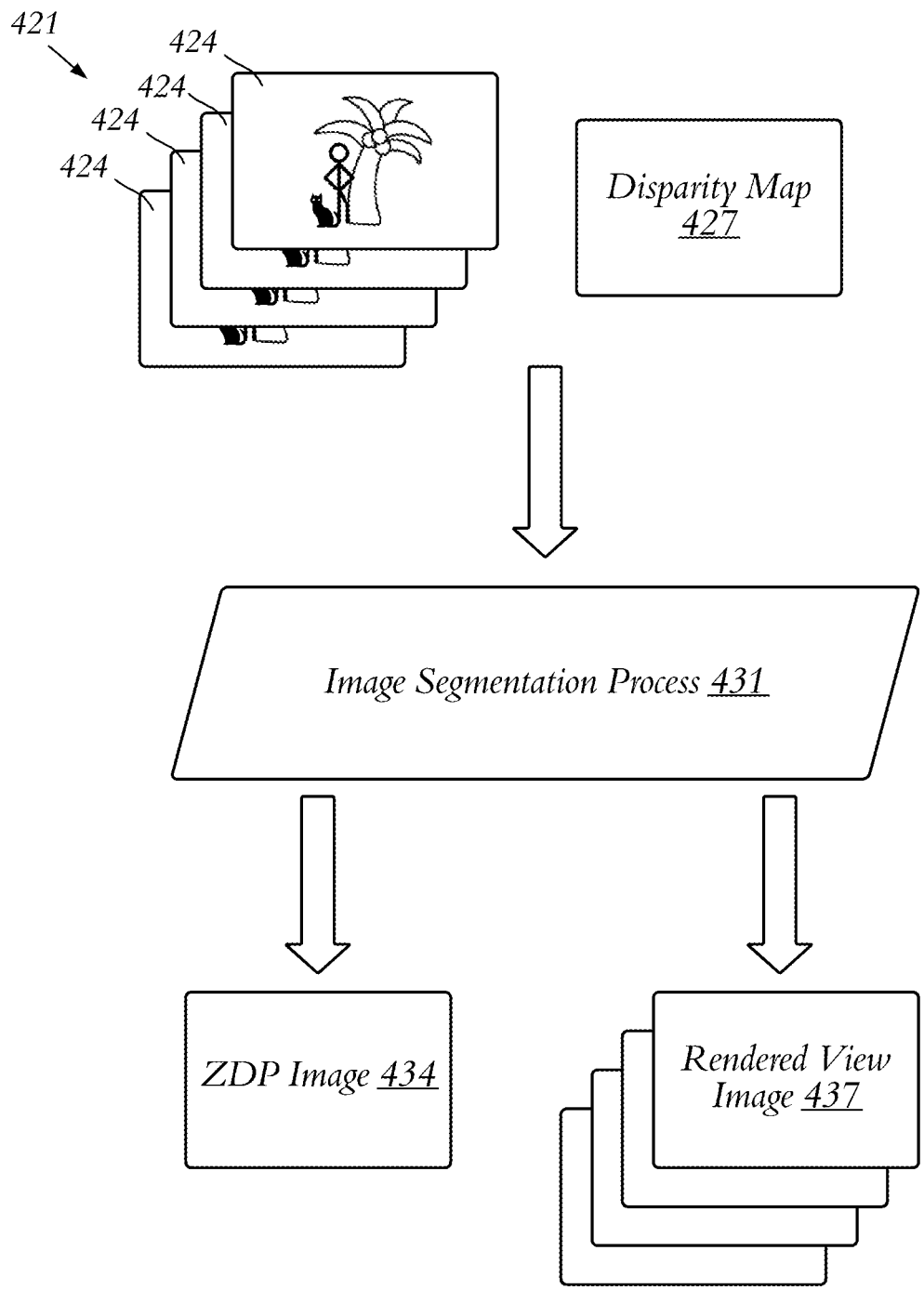
FIG. 7 illustrates an image segmentation process in an example, according to an embodiment consistent with the principles described herein.

FIG. 7 illustrates an image segmentation process 431 in an example, according to an embodiment consistent with the principles described herein. FIG. 7 depicts a method of operating a time-multiplexed multimode display. In addition, FIG. 7 depicts a method of multiview image segmentation. An image segmentation process 431 may be applied to each view image 424 of a multiview image 421. In this respect, the image segmentation process 431 separates the multiview image 421 into a zero disparity plane (ZDP) image 434 (e.g., a first image) and a plurality of rendered view images 437 (e.g., second images). The ZDP image 434 may comprise a subset of pixels of a view image 424, while each rendered view image 437 may comprise remaining pixels of the multiview image 421. The ZDP image 434 may have a similarly high resolution of the multiview image 421. The rendered view images 437 may be down-sampled to a resolution of the time-multiplexed multimode display when it operates in multiview mode. A decision of how the multiview image 421 is segmented into the ZDP image 434 and the rendered view images 437 may be based on a disparity map 427 corresponding to a view image 424 or alternatively a depth map, according to various embodiments. In some embodiments, the depth map may be derived from the disparity map 427, for example.

In some embodiments, the image segmentation process 431 may begin by receiving a multiview image 421 comprising a plurality of view images 424 and one or more disparity maps 427 that associates disparity between different views represented by different view images 424 of the multiview image 421.

As discussed previously, an object may be represented by collection of pixels correspond to a thing in a scene (e.g., a person, a cat, a tree, etc.). The pixels that make up an object may have similar depth with respect to a common viewpoint (e.g., the distance between or relative location of the object and a hypothetical camera that captured an image of the object). The disparity may be quantified as a disparity value for each pixel of the pixel collection, where the disparity value represents the degree of disparity with respect to a corresponding pixel of at least one other view.

The disparity map 427 may assign a disparity value to a corresponding pixel of the view of the multiview image. At least one of the view images 424 may have a corresponding disparity map 427. However, in other examples, more than one view image 424 may have a corresponding disparity map 427. Each pixel in the disparity map 427 may represent a disparity value for a corresponding pixel in the view image 424 of the multiview image 421. For example, the upper left-most pixel in the disparity map image may have a pixel value that represents the disparity for the upper left-most pixel of a first view image. In addition, some views image 424 may be generated by an image capture process while other views image 424 may be generated, at least partially, by artificially predicting, extrapolating, and/or interpolating the views using computer vision techniques. In some embodiments, disparity maps 427 may not be generated by view images 424 that are created by computer vision techniques. In some embodiments, the disparity map 427 is stored as metadata of the multiview image 421.

Next, the image segmentation process 431 may separate a particular view image 424 of the multiview image 421 into a ZDP image 434 (e.g., first image) and a rendered view image 437 (e.g., second image) by applying a predetermined disparity threshold of zero disparity (e.g., a range of disparity values representing zero disparity) to the disparity map 427. In addition, the remaining rendered view images 437 may be generated in a similar manner. Thus, the image segmentation process 431 segments the multiview image 421 into two sets of separate images, a ZDP image 434 and rendered view images 437. The ZDP image 434 may be generated by identifying portions of a view image 424 of the multiview image 421 that correspond to disparity values within the predetermined disparity threshold of zero disparity. For example, the predetermined disparity threshold of zero disparity may be a range of disparity values near zero or close to zero, as discussed in the ranges above. in some embodiments, the image segmentation process 431 may generate a mask to identify pixel locations corresponding to pixels having zero or substantially zero disparity, as defined by the predetermined disparity threshold of zero disparity. Pixels of the view image 424 having zero or substantially zero disparity are identified and extracted to form the zero disparity plane (ZDP) image 434. While the ZDP image 434 may be generated from a single view of the multiview image 421, the ZDP image 434 includes the pixels that correspond to the ZDP with respect to all views of the multiview image 421. The rendered view images 437 may be generated by identifying portions of the view images 424 of the multiview image 421 that correspond to disparity values outside or beyond the disparity threshold. This may comprise applying the inverse of the image mask to identify the remaining, non-ZDP pixels of the rendered view images 437.

In some embodiments, the image segmentation process 431 may include generating an image mask from a disparity map of a multiview image, the image mask specifying pixel locations that correspond to a zero disparity plane of a rendering of the multiview image. For example, the image segmentation process 431 may determine ZDP data (e.g., a disparity map) associated with one or more view images 424 of the multiview image 421. The ZDP data represents controls the location of the ZDP relative to the display of the multiview image 421. The ZDP data may be defined as a range of disparity values in a disparity map 427 centered around a disparity value of zero. The ZDP data may also be determined based on a depth map by determining pixel locations of pixels within a particular depth range. For example, the ZDP data may be recorded as a ZDP image mask (e.g., bitmap mask) where pixels set to a first binary value (e.g., a max pixel value) represent locations of pixels that are within the disparity threshold (i.e., pixels that are part of the ZDP image 434), while pixels of the image mask set to the second binary value (e.g., a min pixel value) represent locations of pixels that are not within the disparity threshold (i.e., pixels that are not part of the ZDP image 434). The image segmentation process 431 may involve generating a zero disparity plane image using the image mask and the multiview image. The ZDP image 434 may be generated by identifying pixels in the multiview image 421 depending on whether pixels are to fall within the ZDP using the ZDP image mask. In addition, the image segmentation process 431 may involve generating the set of rendered view images of the multiview image using, for example, the inverse of image mask. For example, the set of rendered view images may be generated by removing pixels from the multiview image 421 according to the image mask. In addition, the set of rendered view images may be down-sampled to a multiview resolution of the time-multiplexed multimode display.

In some embodiments, the image segmentation process 431 may involve applying a feather mask operation to either or both of the ZDP image 434 or the rendered view images 437. A feather mask operation is an image processing operation that smoothens or blurs the edges of an image. The feather mask operation may involve detecting the edge of an image and applying pixel-level operations to blend or average color values.

The image segmentation process 431 may comprise displaying the zero disparity plane image 434 using the time-multiplexed multimode display during a two-dimensional (2D) mode of the time-multiplexed multimode display, and displaying a set of rendered view images 437 of the multiview image 421 on the time-multiplexed multimode display during a multiview mode of the time-multiplexed multimode display. For example, after segmenting a particular view image 424, the image segmentation process 431 may transmit the ZDP image 434 and the rendered view images 437 to a multimode display. The multimode display may include a two-dimensional (2D) mode and a multiview mode, for example. In this respect, the multimode display may be a time-multiplexed multimode display, e.g., as described above with respect to the time-multiplexed multimode display 100, that can display images in either or both of a 2D format or a multiview format. The display may time-multiplex between the 2D mode and a multiview mode by switching between the two at a predefined frequency. The predefined frequency may be at least as fast as a critical fusion frequency, which is the frequency in which intermittent light from the display appears to be completely steady to the viewer. This may involve frequencies that are greater than about 60 Hertz.

The image segmentation process 431 may be implemented at the application or operating system level. The image segmentation process 431 may invoke functional calls or commands provided by a graphics or video driver to transmit the ZDP image 434 and rendered view images 437 for display as a composite image. For example, a time-multiplexed multimode display may be configured to display the ZDP image 434 and the rendered view images 437 as a composite image.

Figure 8:
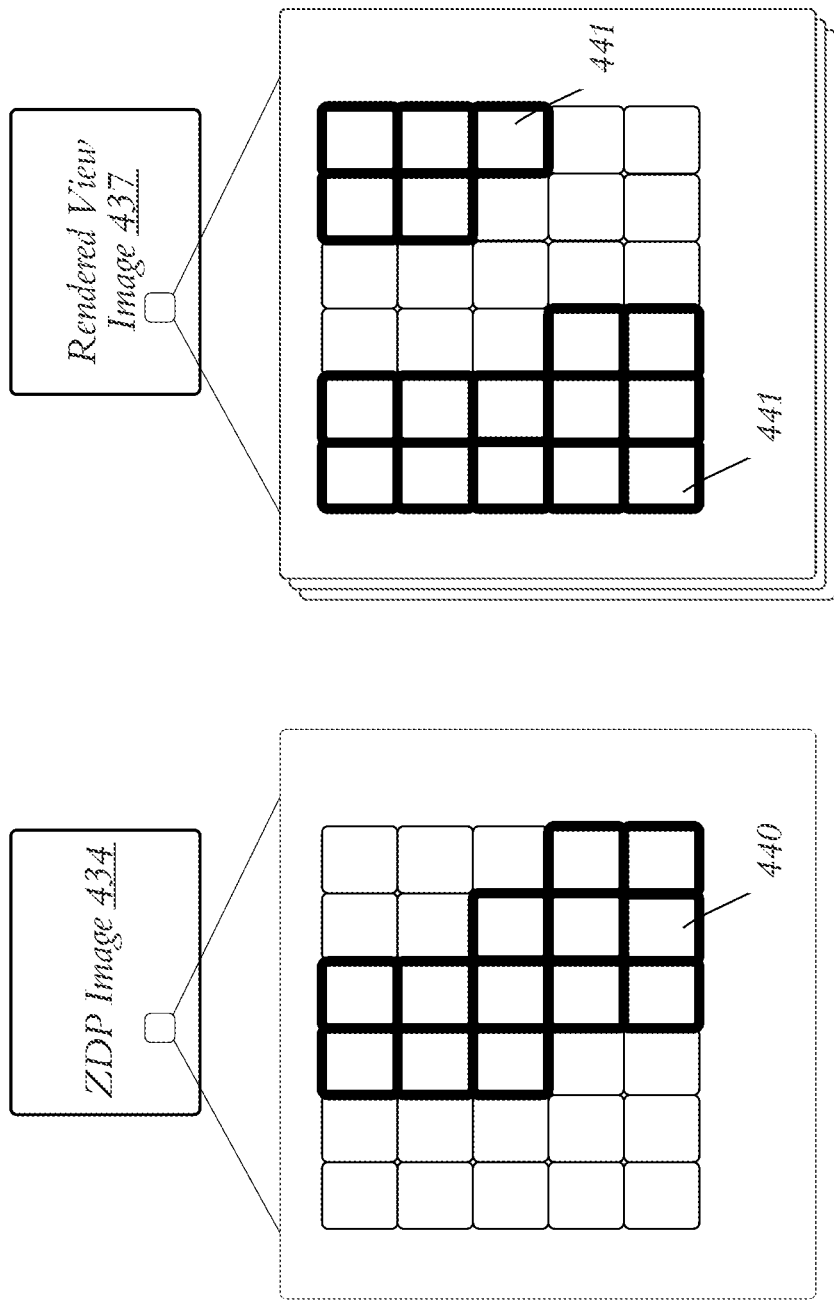
FIG. 8 illustrates an output of an image segmentation process in an example, according to an embodiment consistent with the principles described herein.

FIG. 8 illustrates an output of an image segmentation process in an example, according to an embodiment consistent with the principles described herein. The ZDP image 434 is generated from a particular view and contains the set of pixels 440 of the view that fall within the predetermined disparity threshold of zero disparity, as defined by the ZDP of the time-multiplexed multimode display. Thus, the ZDP image 434 may be view image 424 that is masked by a ZDP image mask to specify pixels corresponding to the ZDP. As a result, only the objects represented by pixels corresponding to the ZDP are included in the ZDP image 434. The rendered view images 437 may also be generated from the multiview image such that each rendered view image 437 contains the set of pixels 441 that fall outside the predetermined disparity threshold of zero disparity. Thus, each view image 424 may be masked inversely by a ZDP image mask to generate a corresponding rendered view image 437. As a result, only the objects with pixels 441 that are not to be rendered on the ZDP have pixels 441 in the rendered view images 437. Thus, if a view contains a person, a cat, and a tree, where only the person is at a distance corresponding to the ZDP, then then ZDP image 434 may have a set of pixels 440 representing only the person, while the rendered view images 437 may have a set of pixels 441 representing the cat and tree. The pixels identifying the person are removed from the rendered view image 437 to provide a luminance curve match between image content of the ZDP image 434 and the set of rendered view images 437 when producing the composite image.

Figure 9:
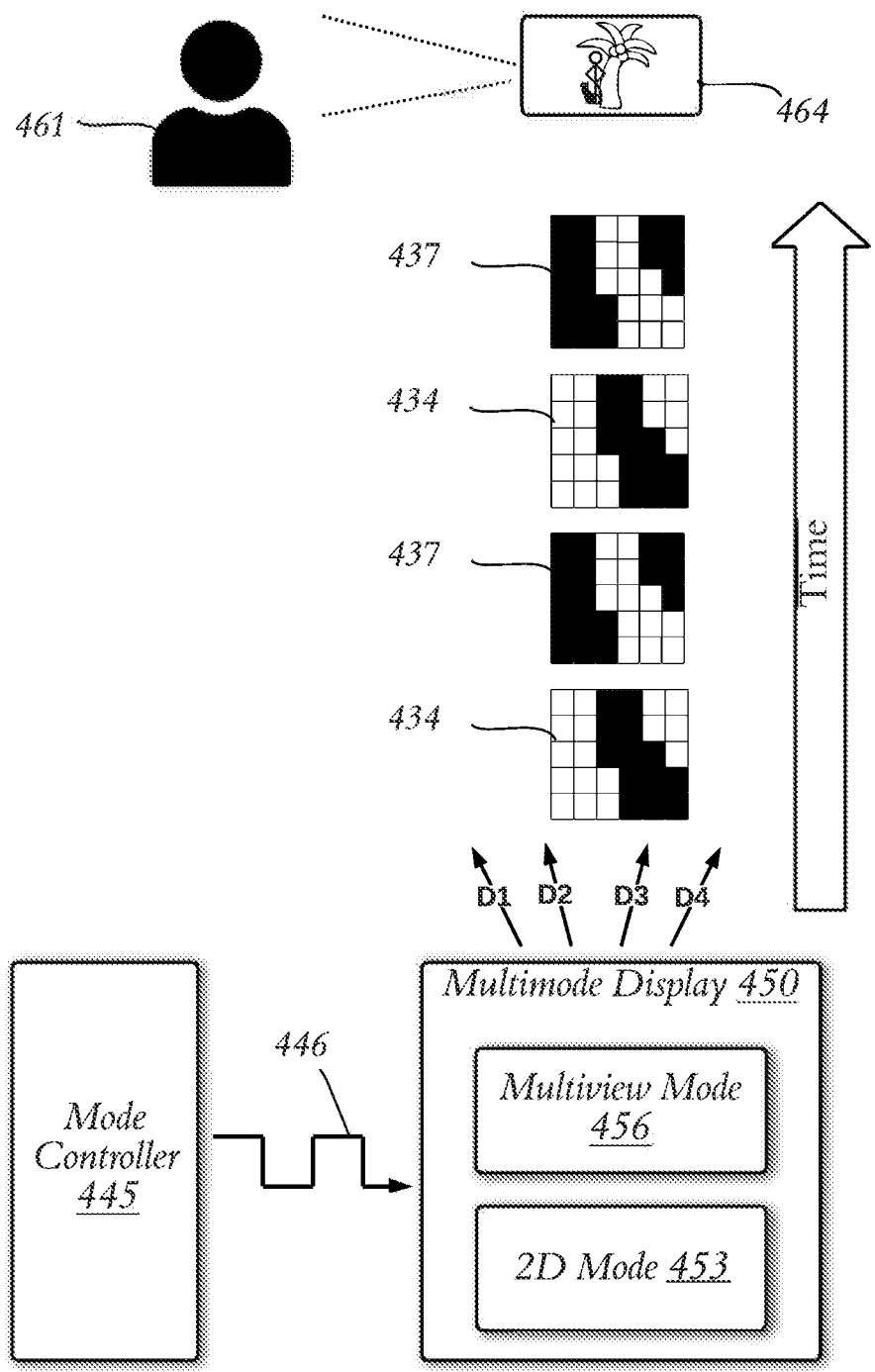
FIG. 9 illustrates a composite image perceived by a user in an example, according to an embodiment consistent with the principles described herein.

FIG. 9 illustrates a composite image perceived by a user in an example, according to an embodiment consistent with the principles described herein. FIG. 9 shows a mode controller 445 that generates a mode selection signal 446 to select a mode of a multimode display 450. In particular, the multimode display 450 may be configured to display images in different modes such as a 2D mode 453 and a multiview mode 456. The multimode display 450 may include a two-dimensional (2D) backlight and a multiview backlight that share a common aperture or screen. For example, multimode display 450 may be substantially similar to the time-multiplexed multimode display 100, as described. The mode selection signal 446 may be a computing instruction, control signal, electrical signal, or any other signal that activates either, none, or both of the 2D display and a multiview display. For example, the mode selection signal 446 provided by the mode controller 445 may selectively activate either a backlight corresponding to the 2D mode or a backlight corresponding to the multiview mode of the multimode display. The multimode display 450 may be a time-multiplexed multimode display such that the various modes (e.g., 2D mode 453, multiview mode 456) alternate or switch over time. For example, mode controller 445 may be substantially similar to the mode controller 130 of the above-described time-multiplexed multimode display 100. The mode selection signal 446 may specific the frequency of switching between 2D mode and multiview mode.

The multimode display 450 may be configured to display the ZDP image 434 and the rendered view images 437. When switching between the ZDP image 434 and the rendered view images 437 at a frequency that exceeds a critical fusion frequency, a viewer 461 may perceive a composite image 464 which appears as a combination of the ZDP image 434 as well as the rendered view images 437. The critical fusion frequency refers to a minimum flicker frequency where flickering light is perceived as continuous. In some embodiments, the critical fusion frequency may be at least 60 Hz. Thus, the composite image 464 is a multiview image having a ZDP image 434 displayed in a 2D mode 453 that is perceivable from a range of view directions (D1-D4). The composite image also includes a set of rendered view images 437 displayed in a multiview mode 456, where each rendered view image 437 corresponds to a respective different one of the view directions (D1-D4).

Figure 10:
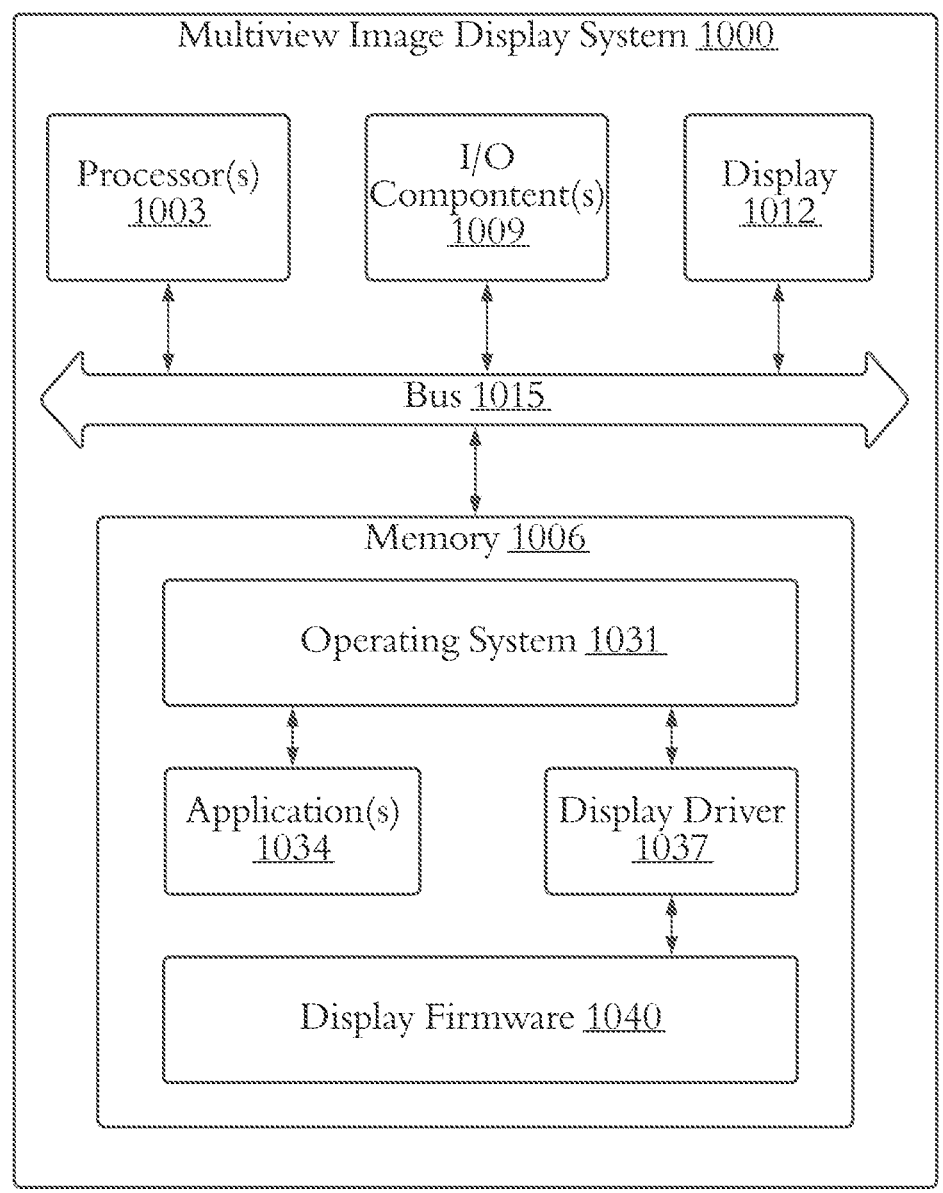
FIG. 10 is a schematic block diagram that depicts an example illustration of a multiview image display system providing a multiview display according to various embodiments.

FIG. 10 is a schematic block diagram that depicts an example illustration of a multiview image display system 1000 (e.g., a computing device that displays multiview images) providing a multimode display according to various embodiments. The multiview image display system 1000 may include a time-multiplexed multimode display 100. The multiview image display system 1000 may be used to implement various methods such as, for example a method of operating a time-multiplexed multimode display. In addition, the multiview image display system 1000 may be configured to implement a segmentation process (e.g., the image segmentation process 431) to enhance quality of multiview images. The multiview image display system 1000 may be a processor and memory-based system, where the memory stores a plurality of instructions, which, when executed by the processor, cause the processor to perform various operations. The operations may cause the processor to receive a multiview image and a disparity map that associates disparity between different views of the multiview image. The processor may generate a zero disparity plane image by selecting pixels from the multiview image according to disparity values specified by the disparity map. The processor may transmit the zero disparity plane image and a set of view images of the multiview image to a time-multiplexed display, the time-multiplexed display configured to display a composite image by rendering the set of view images in a multimode display and rendering the zero disparity plane image in a two-dimensional (2D) display mode.

The multiview image display system 1000 may include a system of components that carry out various computing operations for a user of the multiview image display system 1000. The multiview image display system 1000 may be a laptop, tablet, smart phone, touch screen system, intelligent display system, or other client device. The multiview image display system 1000 may include various components such as, for example, a processor(s) 1003, a memory 1006, input/output (I/O) component(s) 1009, a display 1012, and potentially other components. These components may couple to a bus 1015 that serves as a local interface to allow the components of the multiview image display system 1000 to communicate with each other. While the components of the multiview image display system 1000 are shown to be contained within the multiview image display system 1000, it should be appreciated that at least some of the components may couple to the multiview image display system 1000 through an external connection. For example, components may externally plug into or otherwise connect with the multiview image display system 1000 via external ports, sockets, plugs, or connectors.

A processor 1003 may be a central processing unit (CPU), graphics processing unit (GPU), or any other integrated circuit that performs computing processing operations. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data. For example, the processor(s) 1003 may receive input data (e.g., an image), process the input data according to an instruction set, and generate output data (e.g., a processed image). As another example, the processor(s) 1003 may receive instructions and generate new instructions for subsequent execution.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1006 may refer to the combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the multiview image display system 1000, it should be appreciated that the memory 1006 may be embedded or otherwise integrated, at least partially, into one or more components. For example, the processor(s) 1003 may include onboard memory registers or cache to perform processing operations.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.).

A specific type of I/O component 1009 is a display 1012. The display 1012 may be a multimode display such as, for example the multimode display 450 illustrated in FIG. 9. A capacitive touch screen layer serving as an I/O component 1009 may be layered within the display to allow a user to provide input while contemporaneously perceiving visual output. The processor(s) 1003 may generate data that is formatted as an image for presentation on the display 1012. The processor(s) 1003 may execute instructions to render the image on the display for perception by the user.

The bus 1015 facilitates communication of instructions and data between the processor(s) 1003, the memory 1006, the I/O component(s) 1009, the display 1012, and any other components of the multiview image display system 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as an operating system 1031, an application(s) 1034, a device driver (e.g., a display driver 1037), firmware (e.g., display firmware 1040), or other software components. The operating system 1031 is a software platform that supports the basic functions of the multiview image display system 1000, such as scheduling tasks, controlling I/O components 1009, providing access to hardware resources, managing power, and supporting applications 1034.

An application(s) 1034 executes on the operating system 1031 and may gain access to hardware resources of the multiview image display system 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the multiview image display system 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C#, Objective C, Java©, Swift, JavaScript©, Perl, PHP, Visual Basic©, Python©, Ruby, Go, or other programming languages. The application(s) 1034 may be compiled by a compiler into object code or interpreted by an interpreter for execution by the processor(s) 1003.

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower level instructions implemented by the display 1012 to display an image. The display driver 1037 may process instructions to select a 2D mode, a multiview mode, both modes, or neither modes. Application(s) 1034 that generate, create, or otherwise manage images for display may perform function calls or transmit instructions to the device driver 1037 to cause the image to be rendered and displayed to a user.

Firmware, such as, for example, display firmware 1040, may include machine code or assembly code that allows an I/O component 1009 or display 1012 to perform low-level operations. The display firmware 1040 may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the multiview image display system 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the multiview image display system 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), specialized integrated circuits, or other components, etc.

In some embodiments, the instructions that carry out the functionality and operations discussed above may be embodied in a non-transitory, computer-readable storage medium. The computer-readable storage medium may or may not be part of the multiview image display system 1000. The instructions may include, for example, statements, code, or declarations that can be fetched from the computer-readable medium and executed by processing circuitry (e.g., the processor(s) 1003). In context, a 'computer-readable medium' may be any medium that can contain, store, or maintain the instructions described herein for use by or in connection with an instruction execution system, such as, for example, the multiview image display system 1000.

The non-transitory computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The multiview image display system 1000 may perform any of the operations or implement the functionality (e.g., image segmentation process 431) described above. For example, the flowchart and process flows discussed above may be performed by the multiview image display system 1000 that executes instructions and processes data. While the multiview image display system 1000 is shown as a single device, embodiments are not so limited. In some embodiments, the multiview image display system 1000 may offload processing of instructions in a distributed manner such that multiple computing devices operate together to execute instructions that may be stored, loaded, or executed in a distributed arrangement. For example, at least some instructions or data may be stored, loaded, or executed in a cloud-based system that operates in conjunction with the multiview image display system 1000. In some embodiments, the instructions that implement the functionality described above may be included in an application 1034 that executes on the operating system 1031 or may be included as part of the functionality of the operating system.

Thus, there have been described examples and embodiments of a time-multiplexed multimode display and a method of time-multiplexed multimode display operation that provide a pair of modes configured to operate in a time-multiplexed or time-interlaced manner. Further, there have been described operations and functionality relating to segmenting image views of a multiview image to be displayed by a multimode display according to disparity. For example, embodiments are directed to processing a multiview image so that it displayed in two modes (e.g., a 2D mode and a multiview mode) of a time-multiplexed multimode display resulting in a composite multiview image. Image content corresponding to the ZDP is displayed in a 2D mode while image content outside the ZDP is displayed in a multiview mode. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A method of operating a time-multiplexed multimode display, the method comprising:
identifying pixels within a multiview image that correspond to a zero disparity plane of the time-multiplexed multimode display;
generating a zero disparity plane image comprising the identified pixels;

displaying the zero disparity plane image using the time-multiplexed multimode display during a two-dimensional (2D) mode of the time-multiplexed multimode display; and displaying a set of rendered view images of the multiview image on the time-multiplexed multimode display during a multiview mode of the time-multiplexed multimode display, wherein the time-multiplexed multimode display is configured to switch between the 2D mode and the multiview mode to sequentially display the zero disparity plane image and the set of rendered view images on the time-multiplexed multimode display as a composite image.

2. The method of operating a time-multiplexed multimode display of claim 1, wherein the pixels within the multiview image are selected according to pixel locations specified by a disparity map of the multiview image.

3. The method of operating a time-multiplexed multimode display of claim 2, further comprising generating an image mask from the disparity map based on a predetermined disparity threshold of zero disparity.

4. The method of operating a time-multiplexed multimode display of claim 1, wherein the set of rendered view images are down-sampled to a multiview resolution of the time-multiplexed multimode display, the zero disparity plane image having a resolution of the set of rendered view images prior to down-sampling.

5. The method of operating a time-multiplexed multimode display of claim 1, wherein the rendered view images are generated by removing the identified pixels from the multiview image to provide a luminance curve match between image content of the zero disparity plane image and the set of rendered view images within the composite image.

6. The method of operating a time-multiplexed multimode display of claim 1, the method further comprising:
providing broad-angle emitted light during the 2D mode using a broad-angle backlight;
providing directional emitted light during a multiview mode using a multiview backlight having an array of multibeam elements, the directional emitted light comprising a plurality of directional light beams provided by each multibeam element of the multibeam element array; and
time multiplexing the 2D mode and the multiview mode using a mode controller to sequentially activate the broad-angle backlight during a first sequential time interval corresponding to the 2D mode and the multiview backlight during a second sequential time interval corresponding to the multiview mode,
wherein directions of directional light beams of the directional light beam plurality correspond to different view directions of the set of rendered view images.

7. The method of operating a time-multiplexed multimode display of claim 6, wherein providing directional emitted light comprises:
guiding light in a light guide as guided light; and
scattering out a portion of the guided light as the directional emitted light using multibeam elements of the multibeam element array, each multibeam element of the multibeam element array comprising one or more of a diffraction grating, a micro-refractive element, and a micro-reflective element.

8. The method of operating a time-multiplexed multimode display of claim 7, further comprising providing light to the light guide, the guided light within the light guide being collimated according to a predetermined collimation factor.

9. The method of operating a time-multiplexed multimode display of claim 6, further comprising:
modulating the broad-angle emitted light using an array of light valves to display the zero disparity plane image during the 2D mode; and
modulating the plurality of directional light beams of the directional emitted light using the light valve array to display a multiview image during the multiview mode.

10. The method of operating a time-multiplexed multimode display of claim 9, wherein a size of a multibeam element of the multibeam element array is between one quarter and two times a size of a light valve of the light valve array.

11. The method of operating a time-multiplexed multimode display of claim 1, further comprising applying a feather mask to one or both of the zero disparity plane image and the rendered view images of the multiview image.

12. A method of multiview image segmentation, the method comprising:
generating an image mask from a disparity map of a multiview image, the image mask specifying pixel locations that correspond to a zero disparity plane of a rendering of the multiview image;
generating a zero disparity plane image using the image mask and the multiview image;
displaying the zero disparity plane image using the time-multiplexed multimode display during a two-dimensional (2D) mode of the time-multiplexed multimode display; and
displaying a set of rendered view images of the multiview image on the time-multiplexed multimode display during a multiview mode of the time-multiplexed multimode display,
wherein the time-multiplexed multimode display is configured to switch between the 2D mode and the multiview mode to sequentially display the zero disparity plane image and the set of rendered view images on the time-multiplexed multimode display as a composite image.

13. The method of multiview image segmentation of claim 12, further comprising generating the image mask from the disparity map based on a predetermined disparity threshold of zero disparity.

14. The method of multiview image segmentation of claim 12, wherein the set of rendered view images are down-sampled to a multiview resolution of the time-multiplexed multimode display, the zero disparity plane image having a resolution of the set of rendered view images prior to down-sampling.

15. The method of multiview image segmentation of claim 12, wherein the set of rendered view images are generated by removing pixels from the multiview image according to the image mask.

16. The method of multiview image segmentation of claim 12, further comprising applying a feather mask to one or both of the zero disparity plane image and the set of rendered view images.

17. A multiview image display system, the system comprising:
a processor; and
a memory that stores a plurality of instructions, when executed by the processor, cause the processor to:
receive a multiview image and a disparity map that associates disparity between different views of the multiview image;

generate a zero disparity plane image by selecting pixels from the multiview image according to disparity values specified by the disparity map; and transmit the zero disparity plane image and a set of view images of the multiview image to a time-multiplexed display, the time-multiplexed display configured to display a composite image by rendering the set of view images in a multimode display and rendering the zero disparity plane image in a two-dimensional (2D) display mode.

18. The multiview image display system of claim 17, wherein the plurality of instructions, when executed by the processor, further cause the processor to generate an image mask from the disparity map based on a predetermined disparity threshold of zero disparity.

19. The multiview image display system of claim 18, wherein the set of view images are generated by removing pixels from the multiview image according to the image mask.

20. The multiview image display system of claim 17, wherein the plurality of instructions, when executed by the processor, further cause the processor to apply a feather mask to one or both of the zero disparity plane image and the set of view images.

* * * * *